US008781914B2

(12) United States Patent
Chatter et al.

(10) Patent No.: US 8,781,914 B2
(45) Date of Patent: *Jul. 15, 2014

(54) METHOD, SYSTEM AND APPARATUS FOR AUTOMATIC REAL-TIME ITERATIVE COMMERCIAL TRANSACTIONS OVER THE INTERNET IN A MULTIPLE-BUYER, MULTIPLE-SELLER MARKETPLACE OPTIMIZING BOTH BUYER AND SELLER NEEDS BASED UPON THE DYNAMICS OF MARKET CONDITIONS

(71) Applicant: Peak Silver Advisors, LLC, Boston, MA (US)

(72) Inventors: Mukesh Chatter, Concord, MA (US); Rohit Goyal, Cambridge, MA (US); Priti Chatter, Concord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,930

(22) Filed: Jul. 29, 2013

(65) Prior Publication Data
US 2014/0019257 A1 Jan. 16, 2014

Related U.S. Application Data

(63) Continuation of application No. 12/716,727, filed on Mar. 3, 2010, now Pat. No. 8,577,745, which is a continuation of application No. 11/367,907, filed on Mar. 3, 2006, now Pat. No. 7,778,882.

(51) Int. Cl.
*G06Q 30/00* (2012.01)
*G06Q 30/08* (2012.01)
*G06Q 30/06* (2012.01)

(52) U.S. Cl.
CPC ............ *G06Q 30/08* (2013.01); *G06Q 30/0633* (2013.01)

USPC .............................. 705/26.3; 705/26.8; 705/37

(58) Field of Classification Search
CPC ........................... G06Q 30/08; G06Q 30/0633
USPC .......................................... 705/26.3, 26.8, 37
See application file for complete search history.

(56) References Cited

U.S. PATENT DOCUMENTS 5,794,207 A * 8/1998 Walker et al. ................... 705/77
6,029,141 A * 2/2000 Bezos et al. ................. 705/27.1

(Continued)

FOREIGN PATENT DOCUMENTS

EP     1507225 A1 *  2/2005

OTHER PUBLICATIONS

Earnshaw, A., "Who Needs to Dicker?" Business Journal-Portland, vol. 16, No. 19, p. 19, Jun. 25, 1999.*

(Continued)

*Primary Examiner* — Nicholas D Rosen
(74) *Attorney, Agent, or Firm* — Clock Tower Law Group; Erik J. Heels; Michael A. Bartley

(57) ABSTRACT

A method of communications network shopping by buyers of products and services for purchasing such from sellers in which buyers request an automatic reverse auctioneer or auction controller to initiate a reverse auction in real time amongst willing sellers and to it their automatic real-time iterative bidding price quotations for such products and services to be returned automatically over the network back to the controller under the iterative processing guidance of the controller to assure a best bid price quotation for the buyer; and automatically effecting buyer notification or purchase at such best price, all while the buyer may remain online, and without any manual intervention.

28 Claims, 17 Drawing Sheets

(56) References Cited

U.S. PATENT DOCUMENTS

| | | | |
|---|---|---|---|
| 6,269,343 B1* | 7/2001 | Pallakoff | 705/26.2 |
| 6,604,089 B1* | 8/2003 | Van Horn et al. | 705/26.2 |
| 6,606,607 B1* | 8/2003 | Martin et al. | 705/37 |
| 7,107,227 B1* | 9/2006 | Bezos et al. | 705/14.71 |
| 7,373,325 B1* | 5/2008 | Hadingham et al. | 705/37 |
| 7,778,882 B2* | 8/2010 | Chatter et al. | 705/26.3 |
| 7,895,116 B2* | 2/2011 | Chatter et al. | 705/37 |
| 7,908,200 B2* | 3/2011 | Scott et al. | 705/37 |
| 7,945,509 B1* | 5/2011 | Chatter et al. | 705/37 |
| 8,219,483 B2* | 7/2012 | Chatter et al. | 705/37 |
| 8,301,544 B2* | 10/2012 | Chatter et al. | 705/37 |
| 8,533,097 B2* | 9/2013 | Maass | 705/37 |
| 8,577,745 B2* | 11/2013 | Chatter et al. | 705/26.3 |
| 2001/0034685 A1* | 10/2001 | Kutaragi et al. | 705/36 |
| 2002/0046157 A1* | 4/2002 | Solomon | 705/37 |
| 2002/0065764 A1* | 5/2002 | Brodersen et al. | 705/37 |
| 2002/0147674 A1* | 10/2002 | Gillman | 705/37 |
| 2002/0198818 A1* | 12/2002 | Scott et al. | 705/37 |
| 2003/0126139 A1* | 7/2003 | Lee et al. | 707/100 |
| 2003/0171940 A1* | 9/2003 | Podgurny et al. | 705/1 |
| 2003/0236739 A1* | 12/2003 | Borgeson et al. | 705/37 |
| 2004/0064351 A1* | 4/2004 | Mikurak | 705/7 |
| 2004/0083156 A1* | 4/2004 | Schulze | 705/37 |
| 2005/0240525 A1* | 10/2005 | Bagayatkar | 705/40 |
| 2005/0285822 A1* | 12/2005 | Reddy et al. | 345/76 |
| 2006/0020496 A1* | 1/2006 | Azzarello et al. | 705/5 |
| 2006/0136322 A1* | 6/2006 | Barry et al. | 705/37 |

OTHER PUBLICATIONS

Anon., "In Rapidly Changing E-Business World, No Vendor is an Island," Corporate EFT Report, vol. 20, No. 9, May 10, 2000.*

Anon., "eOrbisB2B Completes $1.6 Million in Procurement for Business Customers," Business Wire, Aug. 31, 2000.*

Johnson, R.K., "Seminar in Grand Forks, N.D., Teaches Art of Selling on EBay," Knight Ridder Tribune Business News, p. 1, Aug. 31, 2002.*

Pledger, M., "Matchmaking Software Builds Business Relationships," Plain Dealer (Cleveland), Final edition, p. C1, Oct. 9, 2002.*

* cited by examiner

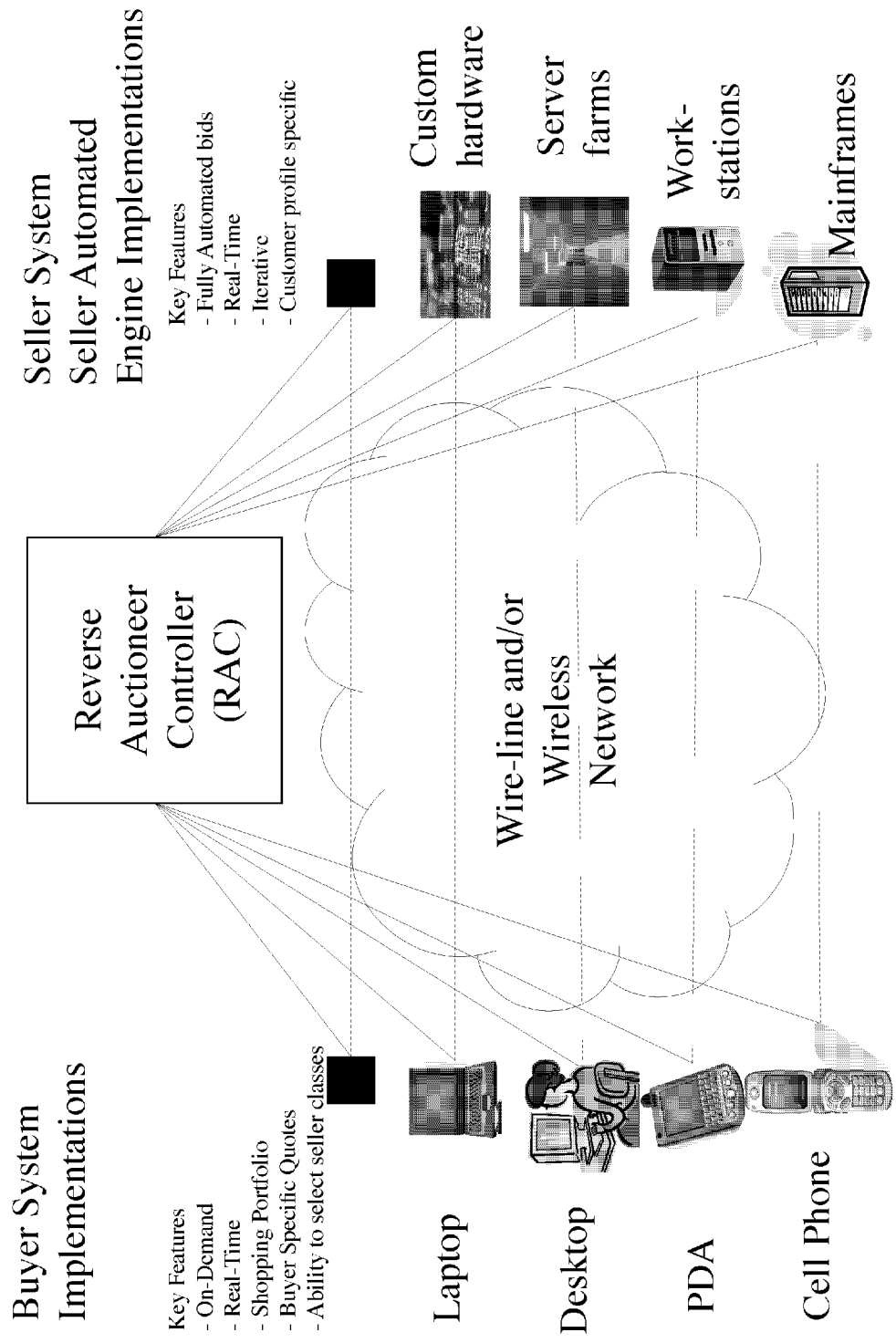

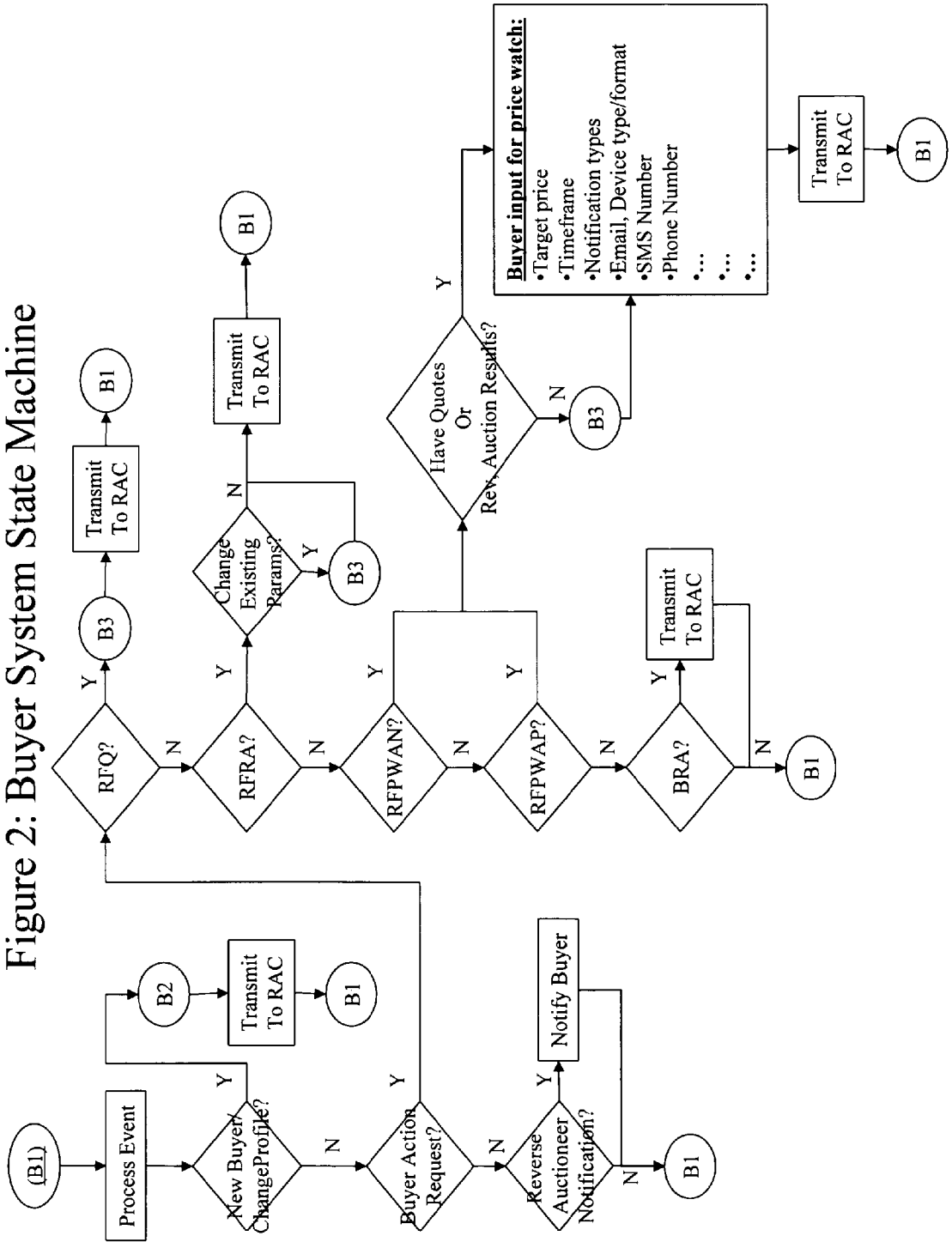
Figure 2: Buyer System State Machine

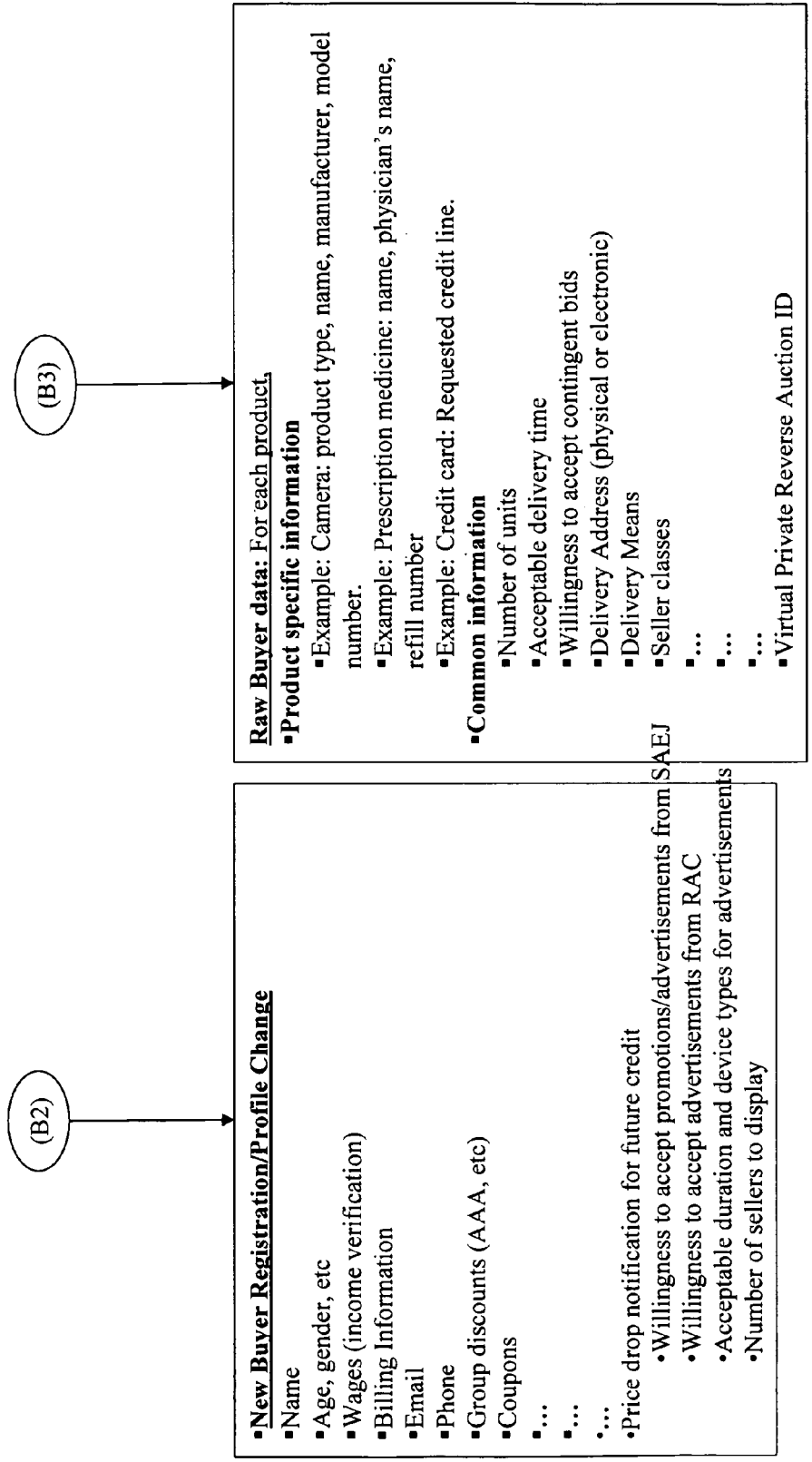

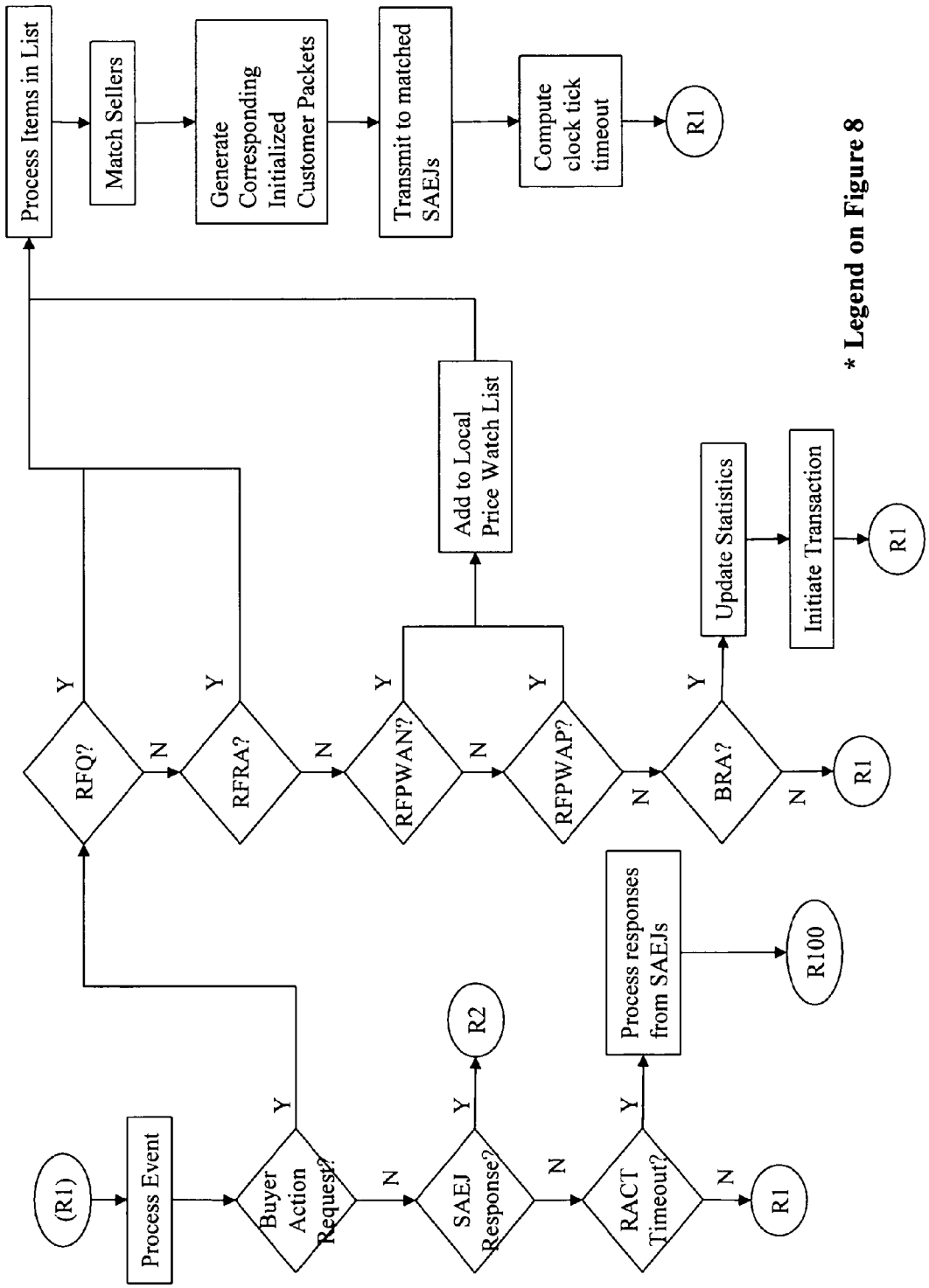
Figure 4: Reverse Auctioneer Controller Sequence*
* Legend on Figure 8

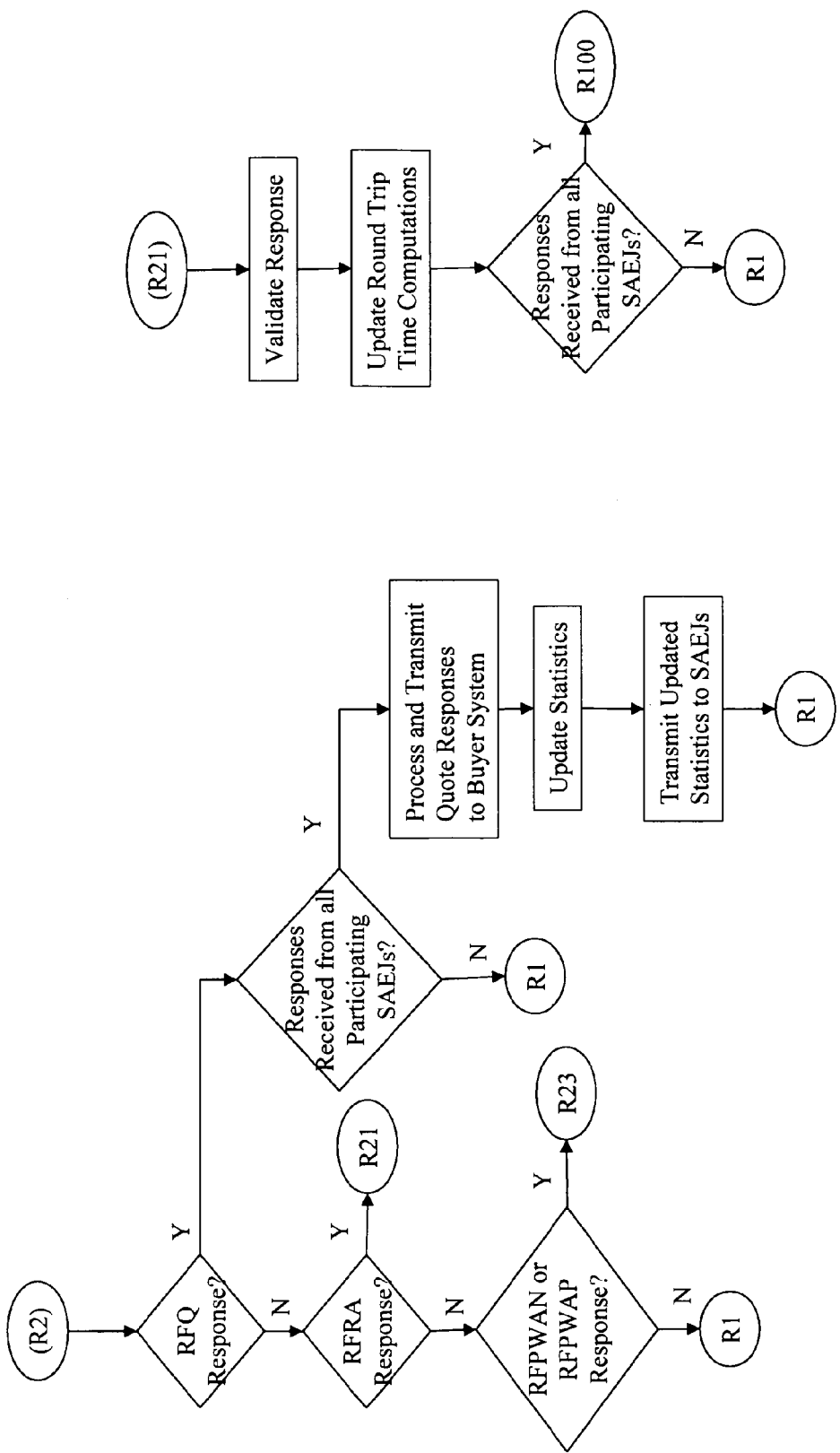
Figure 5: Reverse Auctioneer Controller Sequence*
* Legend on Figure 8

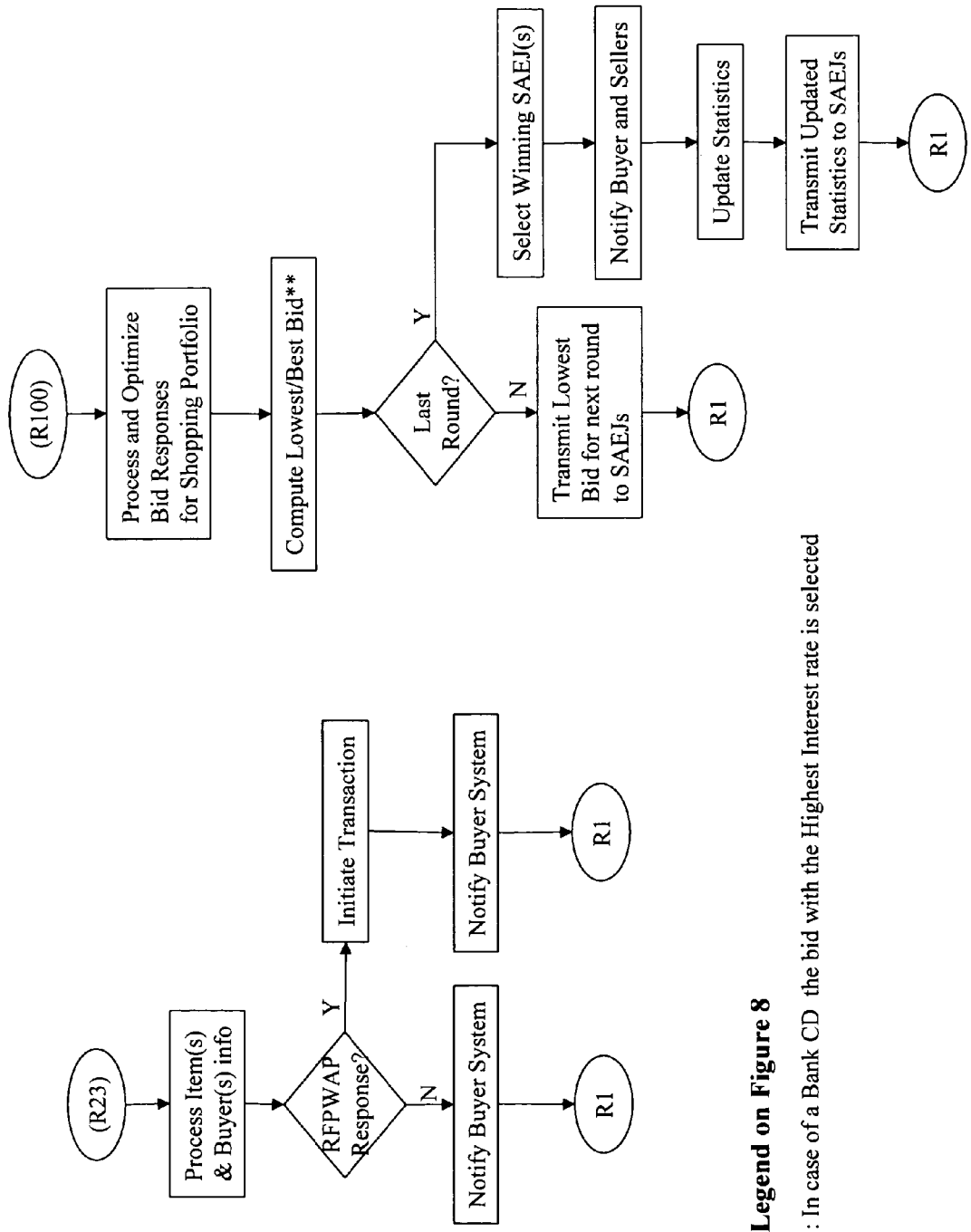
Figure 6: Reverse Auctioneer Controller Sequence*
* Legend on Figure 8
**: In case of a Bank CD the bid with the Highest Interest rate is selected

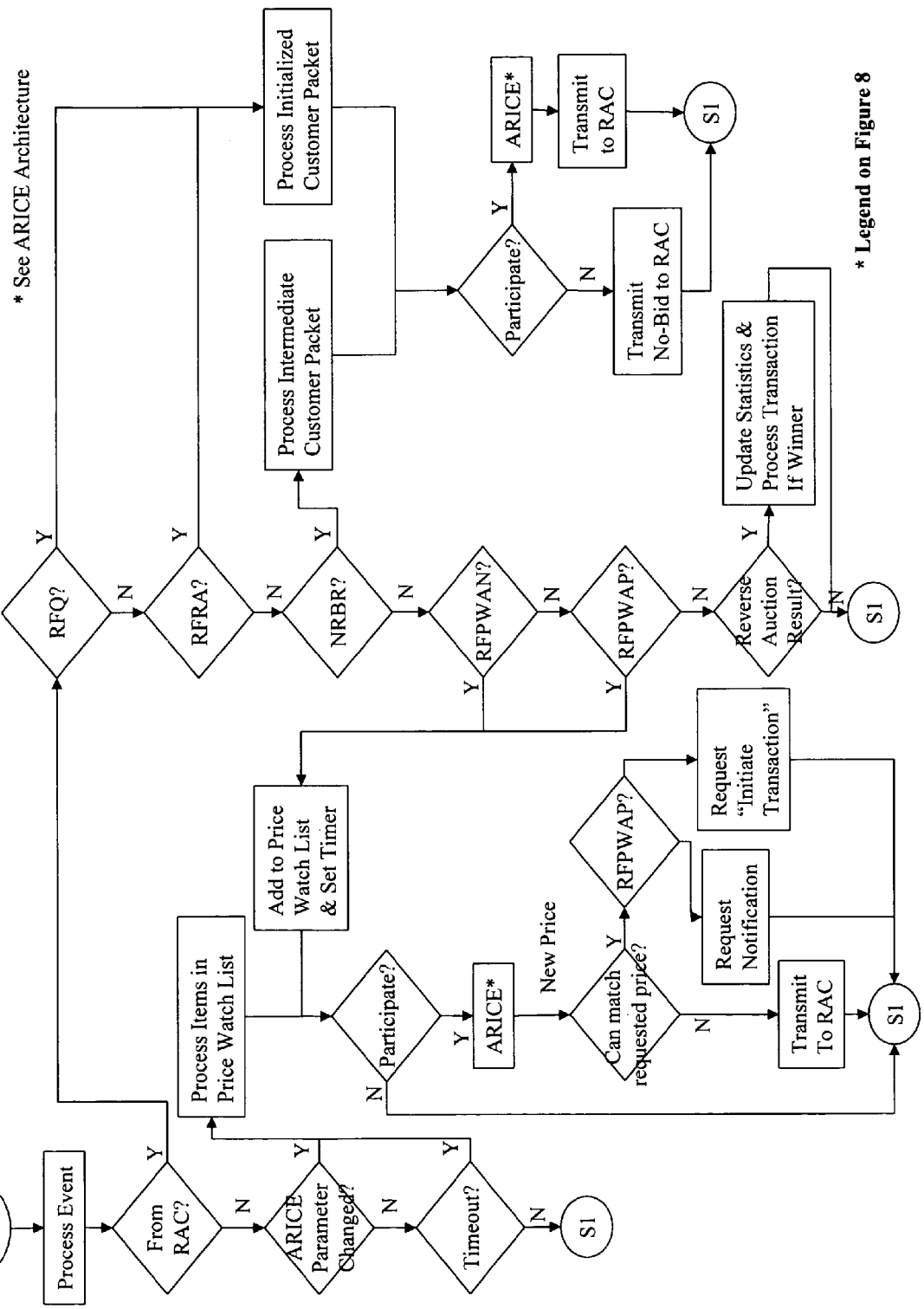

Figure 8: Reverse Auction Acronyms

| | |
|---|---|
| ABR: | Accept Bid Result |
| ARICE: | Adaptive Real-Time Iterative Computation Engine. |
| BRA: | Bid Result Accepted |
| NRBR: | New Round Bid Request |
| Process Event: | Any user input, timer or notification from RAC, BS, SAEJ |
| PWTR: | Price Watch Trigger Response |
| RAC: | Reverse Auctioneer Controller |
| RACT: | Reverse Auctioneer Controller Timeout |
| RASP: | Reverse Auction Service Provider |
| RFPWAN: | Request for Price Watch (RFPW) & Automated Notification |
| RFPWAP: | RFPW & Automated Purchase |
| RFQ: | Request For Quote |
| RFRA: | Request For Reverse Auction |
| SAEJ: | Seller Automated Engine |
| VPRA: | Virtual Private Reverse Auction |
| WN: | Winner Notification |

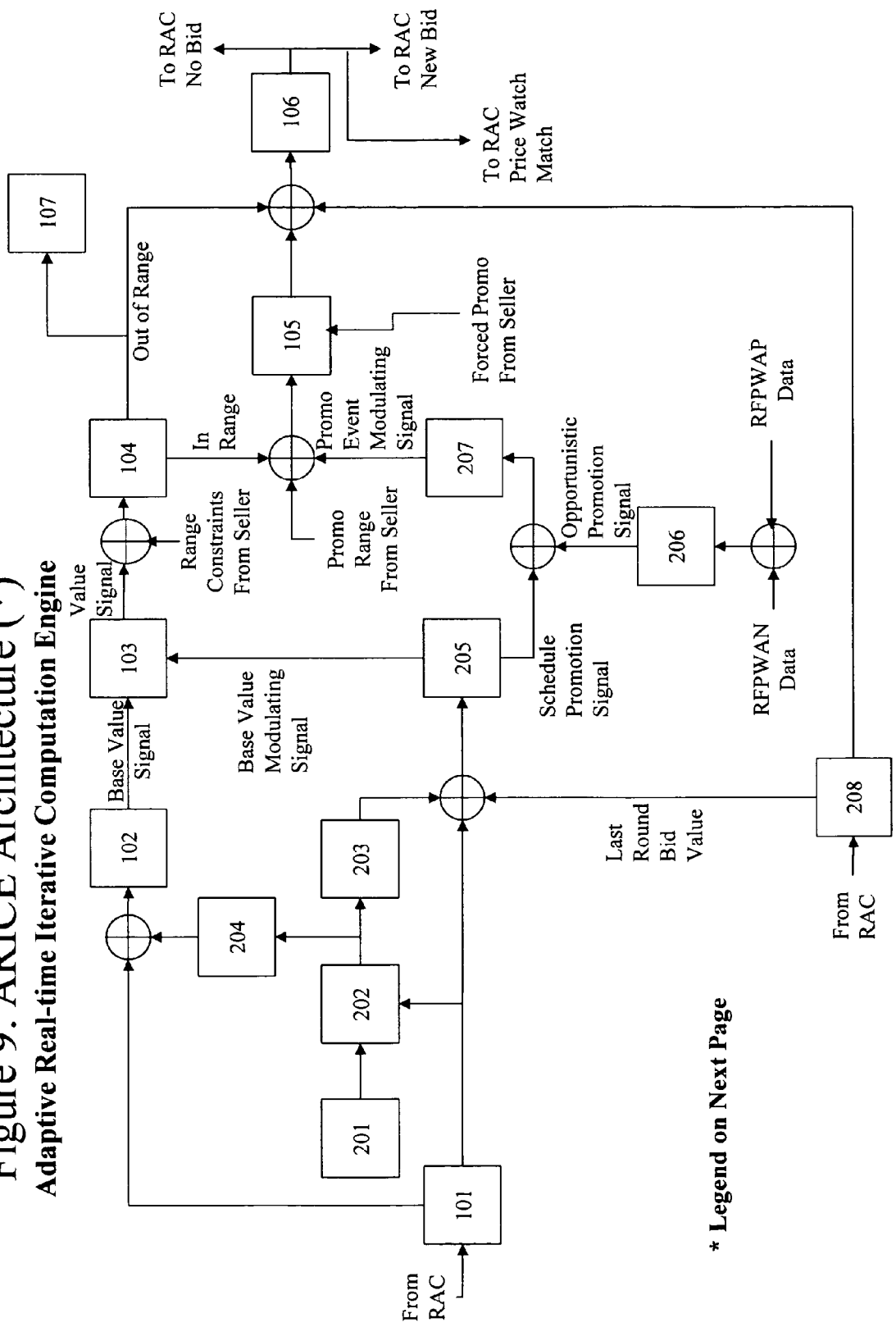
Figure 9: ARICE Architecture (*)
Adaptive Real-time Iterative Computation Engine
* Legend on Next Page Figure 10: ARICE Architecture (Legend)

| | |
|---|---|
| 101: | Initialized Customer Packet |
| 102: | Base Value Signal Generator |
| 103: | Modulator Stage 1 |
| 104: | Range Checker Circuit |
| 105: | Modulator Stage 2 |
| 106: | Comparator Circuit |
| 107: | Out of Range Counter |
| 201: | Historic Processed Customer Packets |
| 202: | Preprocessor Stage 1 |
| 203: | Hysterisis Micro Filter |
| 204: | Hysterisis Macro Filter |
| 205: | Preprocessor Stage 2 |
| 206: | Opportunistic Promotion Signal Generator |
| 207: | Promotional Event Generator |
| 208: | Intermediate Customer Packet |
| ARICE: | Adaptive Real-time Iterative Computation Engine |
| RAC: | Reverse Auctioneer Controller |
| RASP: | Reverse Auctioneer Service Provider |
| RFPWAN: | Request For Price Watch & Automated Notification |
| RFPWAP: | Request For Price Watch & Automated Purchase |

New Figure 11: Customer Packet Format (*)
(Initialized, Intermediate and Processed)

| CTRL | | | | | | | | | | |
|---|---|---|---|---|---|---|---|---|---|---|
| CIN | | | | | | | | | | |
| PB ID | SB ID | SELLER ID | RAC ID | RA ID | | | | | | |
| ID | BAR | PROD INFO | DLV INFO | REQ INFO | DISC INFO | BID INFO | BSYS DEF | RAC DEF | SAEJ DEF | TRANS | VPRA ID |
| ID | BAR | PROD INFO | DLV INFO | REQ INFO | DISC INFO | BID INFO | BSYS DEF | RAC DEF | SAEJ DEF | TRANS | VPRA ID |
| • • • | | | | | | | | | | |
| ID | BAR | PROD INFO | DLV INFO | REQ INFO | DISC INFO | BID INFO | BSYS DEF | RAC DEF | SAEJ DEF | TRANS | VPRA ID |
| PROMO OK | PROMO DUR | AD OK | DEV TYPE | FORMAT | | | | | | |
| PADINCL | VIDEO | AUDIO | EMAIL | • • • | SMS | POD CAST | | | | |
| ERRCODE | DIAG | | | | | | | | | |
| RTT | BSTS | SAEJTS | RACTS | TCTS | | | | | | |
| USERDEF | USERDEF | | | | | | | | | |
| CHKSUM | FEC | | | | | | | | | |
| EOP | | | | | | | | | | |

(*) Legend on next page.
Each field may have multiple entries as shown in Legend.
Some fields are specific to product type.

New Figure 12: Customer Packet Format (Legend)

Buyer System Defined Fields

| | |
|---|---|
| AD OK: | Willing to Accept Advertisements |
| BAR: | Buyer Action Request (RFQ, RFRA etc) |
| BSTS: | Buyer System TimeStamp |
| BSYS DEF: | Buyer System Defined field |
| DEV TYPE: | Acceptable Device Types for Advertisements |
| DISC INFO: | Coupons, Group Discount |
| DLV INFO: | Acceptable Delivery Time, Delivery Means, Delivery Address (physical or electronic). |
| FORMAT: | Acceptable Format Types for Advertisements |
| PB ID: | Primary Buyer ID |
| PROD INFO: | Product Information (type, manufacturer ID, product specific), Quantity |
| PROMODUR: | Acceptable Duration for Promotions |
| PROMO OK: | Willing to Accept Promotions |
| REQ INFO: | Seller Classes, Number of Lowest Sellers to Return, Willingness to accept contingent bids, Request price drop notification for future credit |
| SB ID: | Sub Buyer ID |
| VPRA ID: | Virtual Private Reverse Auction ID |

RAC / SAEJ Defined Fields

| | |
|---|---|
| BID INFO: | Number of Bidders in Round, Pre-specified number of lowest bids, Bid Number, Bid Amount, NoBid, Final Bid, Type of Bid (Current Bid, Starting Bid, Lowest Bid, Lowest Bid Seller ID, Lowest Bid Seller Class, Sellers Own Bid/Quote, Contingent Bid), Bid Timestamp |
| CIN: | Consumer Index Number |
| ID: | Unique ID for each product type in reverse auction |
| PADINCL: | Promotion or Advertisement Included |
| RAC DEF: | RAC Defined Field |
| RA ID: | Unique Reverse Auction ID |
| RAC ID: | Reverse Auctioneer Controller ID |
| RACTS: | Reverse Auctioneer Controller TimeStamp |
| RTT: | Round Trip Time |
| SAEJ DEF: | SAEJ Defined Field |
| SAEJTS: | Seller Automated Engine TimeStamp |
| SELLER ID: | Seller ID |
| TCTS: | Transaction Completion TimeStamp |
| TRANS: | Transaction Info |

Generic Fields

| | |
|---|---|
| CHKSUM: | Checksum |
| CTRL: | Control Header |
| DIAG: | Diagnostic Information |
| EOP: | End Of Packet |
| ERROR: | Error Code |
| FEC: | Forward Error Correction |
| USERDEF: | User Defined |

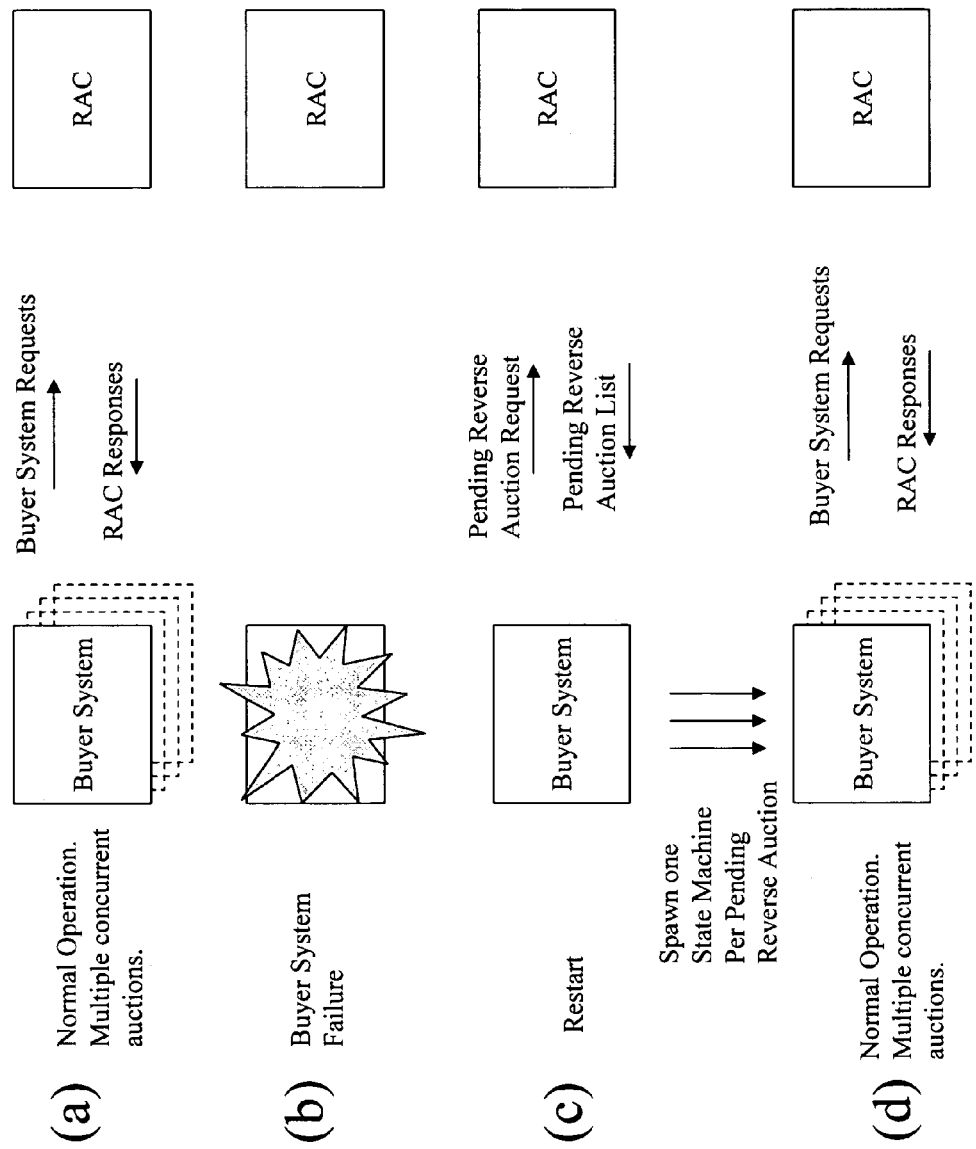
Figure 13: Buyer System Fault Tolerance

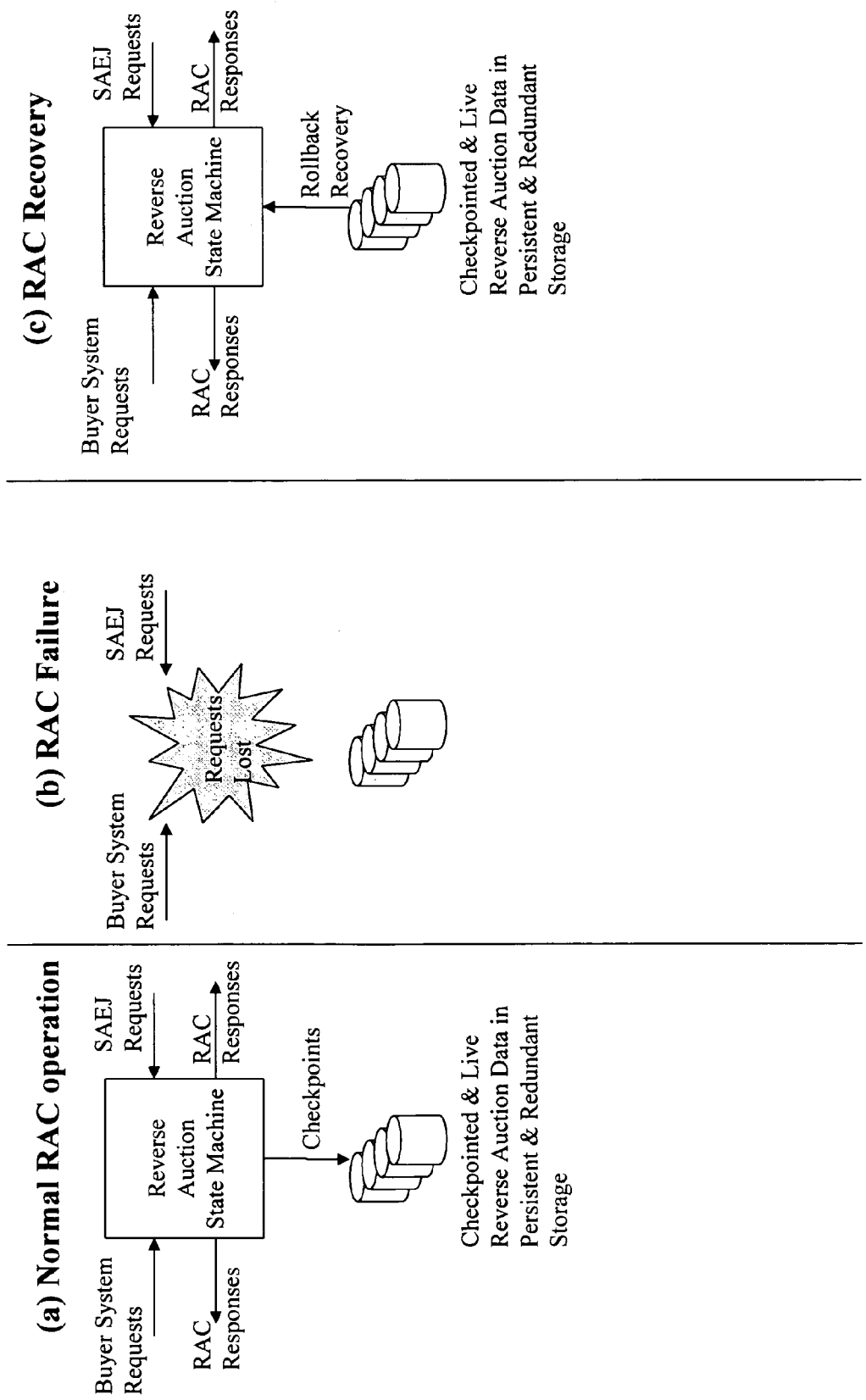
Figure 14: RAC Checkpointing and Rollback Recovery

Figure 15: RAC 1:1 Hot Standby
(a) Normal Redundant RAC Operation
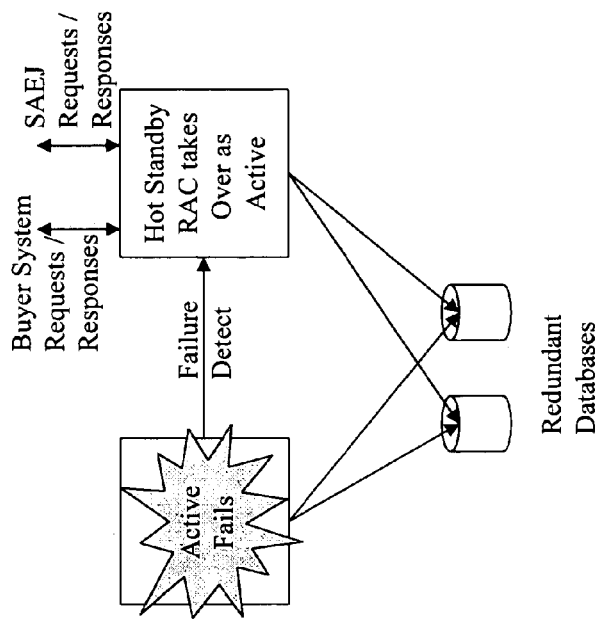
(b) RAC Operation During Active Failure
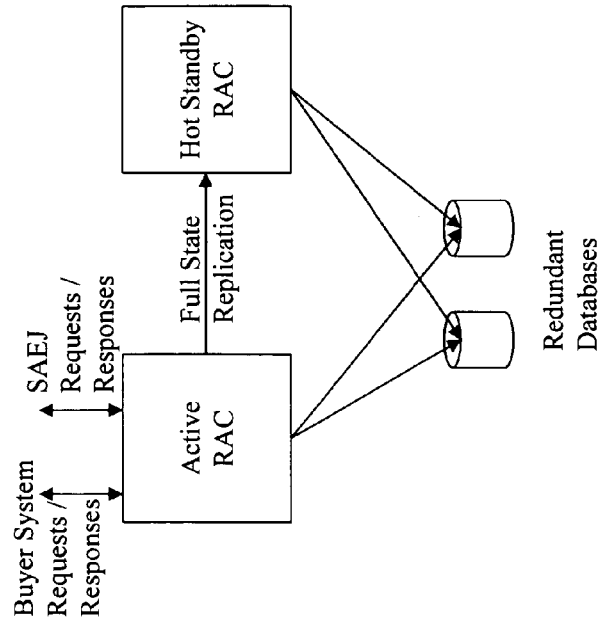

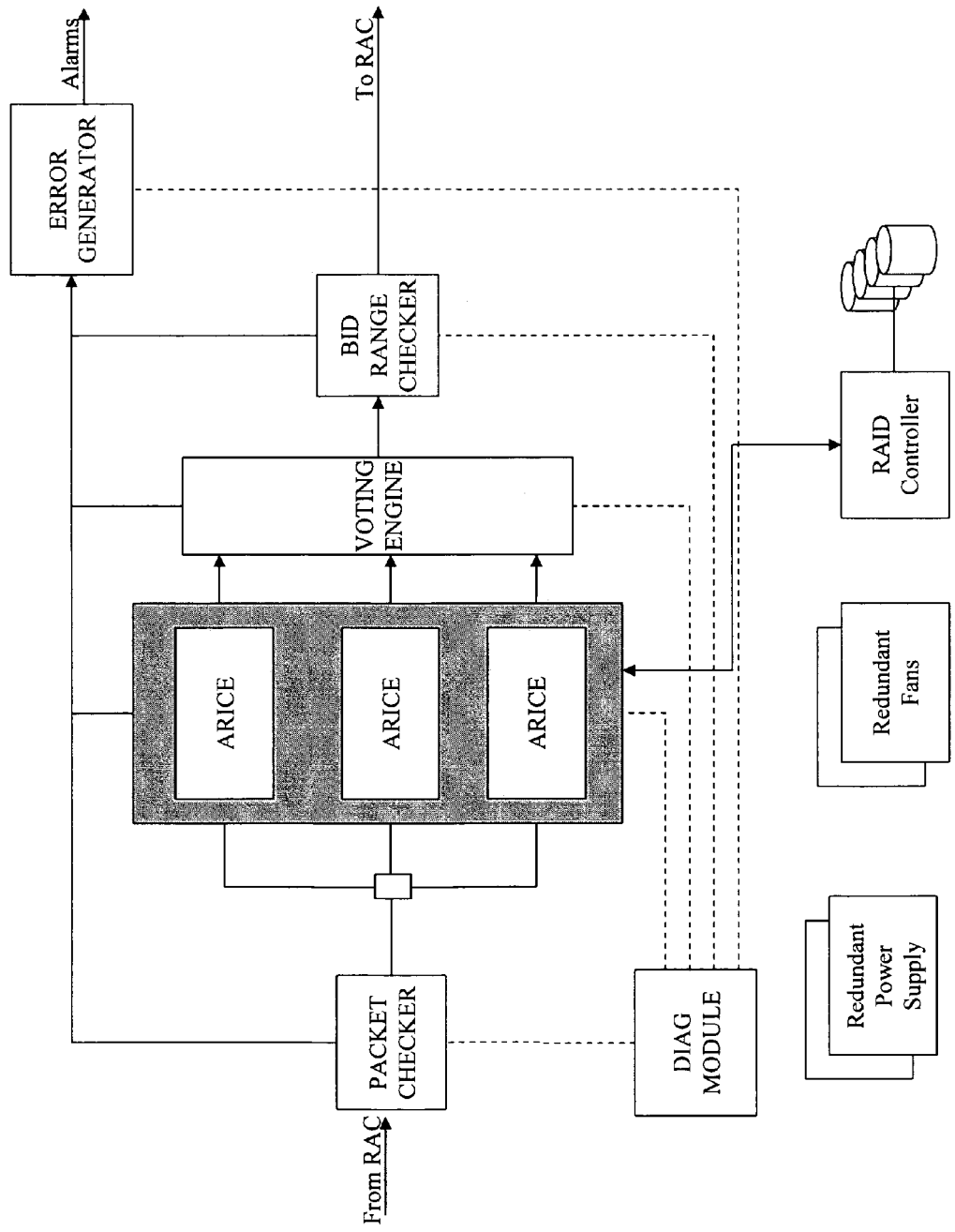
Figure 16: SAEJ Fault Tolerance Architecture

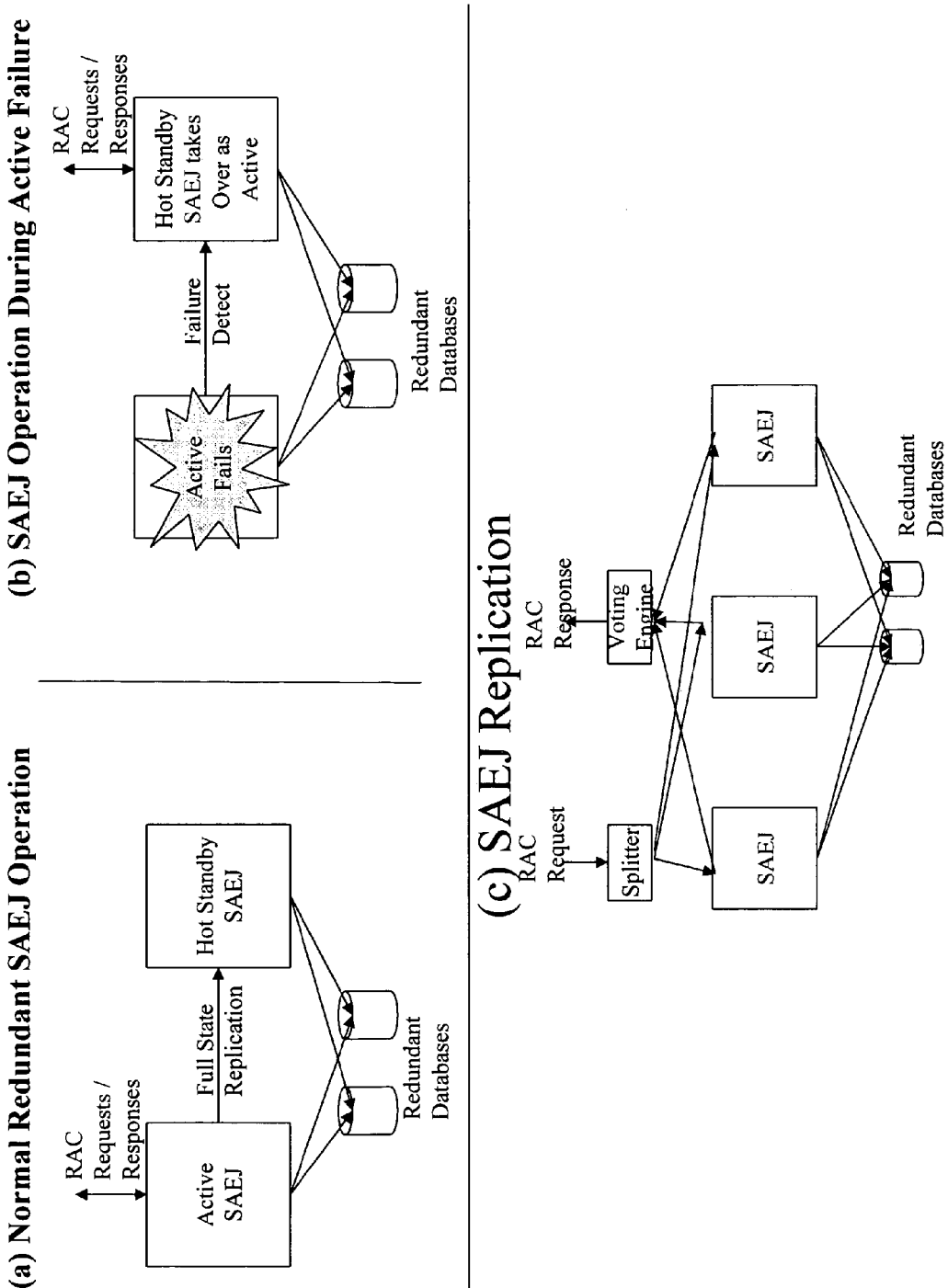
Figure 17: SAEJ 1:1 Hot Standby

METHOD, SYSTEM AND APPARATUS FOR AUTOMATIC REAL-TIME ITERATIVE COMMERCIAL TRANSACTIONS OVER THE INTERNET IN A MULTIPLE-BUYER, MULTIPLE-SELLER MARKETPLACE OPTIMIZING BOTH BUYER AND SELLER NEEDS BASED UPON THE DYNAMICS OF MARKET CONDITIONS

CROSS-REFERENCE TO RELATED APPLICATIONS

This application is a continuation of U.S. patent application Ser. No. 12/716,727, filed Mar. 3, 2010, titled "METHOD, SYSTEM AND APPARATUS FOR AUTOMATIC REAL-TIME ITERATIVE COMMERCIAL TRANSACTIONS OVER THE INTERNET IN A MULTIPLE-BUYER, MULTIPLE-SELLER MARKETPLACE OPTIMIZING BOTH BUYER AND SELLER NEEDS BASED UPON THE DYNAMICS OF MARKET CONDITIONS" in the name of Mukesh Chatter, Rohit Goyal, and Priti Chatter, which is a continuation of U.S. patent application Ser. No. 11/367,907, filed Mar. 3, 2006, now U.S. Pat. No. 7,778,882, issued Aug. 17, 2010, titled "METHOD, SYSTEM AND APPARATUS FOR AUTOMATIC REAL-TIME ITERATIVE COMMERCIAL TRANSACTIONS OVER THE INTERNET IN A MULTIPLE-BUYER, MULTIPLE-SELLER MARKETPLACE OPTIMIZING BOTH BUYER AND SELLER NEEDS BASED UPON THE DYNAMICS OF MARKET CONDITIONS" in the name of Mukesh Chatter, Rohit Goyal, and Priti Chatter, both of which are hereby fully incorporated by reference.

FIELD OF INVENTION

This invention relates generally to the field of on-line shopping for products and services over the Internet, being more particularly concerned with electronic transactions with price-comparison features as pioneered by, for example, web portals of Yahoo Inc. and others, and by web search engines for accessing sellers with the lowest price, such as of Bluefly Inc. and others, and being more specifically concerned with buyer-seller real-time iterative bidding and offering in close simulation of the mechanisms of real marketplace auctions and for the benefit of both buyer and seller interests.

The term "Internet" as used in this application is specifically intended to embrace generically all types of public and/or private communication networks using wireless and/or wired transmission media, and combinations of the above, and also, specifically the satellite world wide web.

BACKGROUND OF INVENTION

In co-pending U.S. patent application Ser. No. 298,967, publication number 2004/0098477 of Reiner Kraft of IBM, published May 20, 2004, it is stated that, despite the development of Internet web search engines and web crawlers for trying to match buyers requests with sellers offers, the prior art had not yet provided a method of communication between buyer and sellers that allows a free marketplace interaction—a need that "has heretofore remained unsatisfied". The Kraft patent application suggests trying to solve this problem with a decentralized distributed architecture utilizing a peer-to-peer seller network to serve as an active marketplace, with closer to "real-time" price comparisons.

Examples of such prior art matchmaking techniques are contained in, for example, US patent application publication no. 20040135966 of eBay, and in IBM US application publications nos. 20020007337 (Jan. 17, 2002), 20020022967 (Feb. 21, 2002), 20020143660 (Oct. 3, 2002), 20020156686 (Oct. 24, 2002), 20020165815 (Nov. 7, 2002), 20020178108 and 20020178072 (Nov. 28, 2002), 20020188545 (Dec. 12, 2002), 20030028469 (Feb. 6, 2003), 20030110047 (Jun. 12, 2003), and 20040267630 (Dec. 30, 2004),—but none solving the problem of allowing merchants and customers to interact in a free marketplace format, but rather just offering comparison shopping solutions that are, however, quite limited.

Like the above-cited Kraft-IBM application, the present invention is also concerned with how to buy and sell desired products or services in a multiple-buyer multiple-seller marketplace in an inherently fair and optimized manner both for the buyer and for the seller, and also based on the real-time dynamics of marketplace conditions.

More specifically, the present invention addresses the problem of how to buy a product at the lowest possible value at that time as derived by instantaneously making hundreds or thousands of sellers or more, compete amongst themselves in real-time to win the buyer's business, and be ready and available to do so on a twenty four-hour, seven-day/week basis, and, further, independent of geographic boundaries.

Otherwise stated from the seller's perspective, how profitably to sell to a large geographically dispersed customer or buyer base, in an on-line environment growing a large number of competing sellers with ever-changing market dynamics, and without spending huge resources in terms of man-power, infrastructure, and mass advertising.

In an environment of a large number of suppliers of similar goods, indeed, buyers and sellers face different problems. From the buyer's perspective, existing mechanisms do not force the sellers to compete iteratively amongst themselves to win the business. The current mechanisms, both on-line and off-line, are inefficient and their response is either non-instantaneous or provides a quality of information that is stale. From the seller's perspective, furthermore, the existing solutions do not allow sellers to be highly responsive either to the competition or to the customers. They are forced to spend dedicated man-power and associated expenditures for current on-line non-automated, largely non-real-time systems which, indeed, may even neutralize any meaningful derivable benefits.

Such and other limitations in prior attempts to address these issues will now be reviewed.

Current "Solutions" and Proposals

The "conventional" way of buying goods, of course, involves a buyer visiting a few stores, making price comparisons, and then deciding to buy or not to buy—still the most prevalent system. Alternatives to this are emerging especially as on-line solutions in the form of 'Web Crawling', and so called 'Reverse Auction'. These solutions attempt to be more 'Buyer-Centric' and tend to work better when the supply of goods is plentiful, and widely available.

Another mechanism used primarily by wholesale buyers is a private 'Reverse Auction' where the buyer is also the 'Reverse Auctioneer' and assumes all its functions and responsibilities, holding an on-line auction amongst sellers participating on an invitation-only basis.

These approaches and their variations, however, suffer from a number of serious constraints due to their inherent limitations.

The buyer, in practice, can only visit but a few shops, both on-line and off-line, and/or secure only a few quotes for price comparisons in order to enable the making of a decision and then to proceed to buy in person or to have the goods shipped.

An alternative is to use the before-mentioned 'Web Crawlers'- to inspect various seller web sites, extract the pricing information and then present such to the prospective buyer. An example may be that of a buyer using a web crawler such as 'PriceGrabber.com' to find the lowest price sources for a prescription medicine. The challenges are, however, that the search is non-exhaustive, highly influenced by the advertisers, the information received is often stale and not consistent across various sellers resulting in apple-to-orange comparisons; and, with respect to this example, medicine suppliers are not forced iteratively to bid amongst themselves to offer the best possible competitive price.

Another alternative is to use the earlier referenced so-called on-line 'Reverse Auctioneer' companies, such as 'Shopzilla', who sign-up a number of sellers interested in providing pricing information to the buyers. The pricing data is kept at the reverse auctioneer, with the sellers providing the pricing information for its database and subsequently providing that data to the buyer. This data is generally manually updated using a proprietary protocol defined by the reverse auctioneer on a periodic basis such as daily, weekly or monthly. Different sellers, indeed, update the pricing data at different frequencies independent of one another and subject to their own resource constraints. Thus, in between these updates, the data provided by the reverse auctioneer to the buyer's 'request for lowest pricing' is usually stale, non-competitive and inaccurate. At times, some reverse auctioneers use a one time email process where sellers provide an updated price in response to the email request—a non-instantaneous and non-competitive process. The buyer waits until these emails have been manually answered—a process that can take hours or days. The sellers, furthermore, operate independently of one another and are certainly not forced to compete in real-time to bid for a buyer's business. This lack of on-demand accurate response, coupled with the lack of competition, actually demonstrates that this kind of manual 'Reverse Auction' is, indeed, a misnomer, though the term is used primarily for marketing promotion purposes. In reality, no meaningful reverse auction takes place at all.

A variation, used primarily by some large enterprise buyers is the 'Private Reverse Auction' in which sellers may participate only by invitation. This is typically done by large corporations to procure bulk raw material, etc. from their big supplier partners. In case of such 'Private Reverse Auctions', typically, the buyer also acts as the reverse auctioneer. It also installs and maintains the requisite infrastructure, and assumes all its functions and responsibilities, including security, authentication, advance scheduling, and notification, etc. and also the management.

This problem of stale pricing and the actually non-competitive nature of the sellers' participation, is also well articulated in the before referenced Kraft-IBM patent application. Unfortunately, the solution proposed therein to use peer-to-peer seller network technology also has inherent serious limitations. In this peer-to-peer approach, a buyer's request is sent to potentially millions of other seller peers who either choose to update their price with their own better pricing or let it pass to the next peer in the chain. Prior to updating the price, however, the selling peer needs to get the buyer's permission to validate its legitimacy. The burden is on the buyer to verify each such selling peer's legitimacy, reputation and history—a very challenging and time consuming effort indeed. The process then continues until the interested sellers have been exhausted—also a long and drawn out sequential process though somewhat superior in some aspects only when compared with previous alternatives outlined above. This proposed solution, moreover, imposes a far higher burden on the buyer both in terms of functions to be performed and the responsibilities, and makes it very time consuming. The burden really effectively gets transferred from a non-real-time 'Seller System' to a very interactive manual intervention-driven 'Buyer System', with not many apparent benefits. The inherent long latency and other well-known limitations of the peer-to-peer networks combined with the requisite active manual intervention of the buyer may even result in not only a potentially slower system, but also a far more buyer-adverse system than the previously discussed proposals.

These above-referenced prior solutions and ones similar thereto are sometimes hereinafter collectively referred to as the 'conventional' so-called solutions.

Prior Art 'Buyer' Limitations

As mentioned above, such 'conventional' prior art proposed solutions, suffer from a significant number of limitations that tend to prevent the buyer from realizing the opportunity to get the best real-time price or value on-demand, and the opportunity for the sellers to realize the opportunity to offer the most competitive prices, as will now be summarized.

First, in the response to the buyer's request, the prices provided by the reverse auctioneer immediately after the request are typically stale; some by hours, some by days, weeks or a month. The buyer does not know; furthermore, when the prices were last quoted or updated by each prospective seller for each product in the data base of the reverse auctioneer. The information provided from the data base on behalf of a large number of sellers, even for a single product, is accordingly typically stale. The e-mail request process is very slow as it relies on collecting information in non-real time, with the buyer being made to wait until all the sellers have responded at their own pace within their respective constrained resources, which can well take hours or days. This is clearly not a true real-time and on-demand response. As for the Kraft-IBM peer-to-peer network system, the 'Request for Quote' itself could take hours through the network, thus neutralizing the attempt for approaching real-time competitive pricing. The ability to re-bid is also missing. At times, it could be even worse should there be a malicious peer, or in the event a conventional 'Seller System' was very punctual in responding to emails, even beating the peer-to-peer based approach. This is effectively equivalent to sending email, except the response does not require a manual intervention on the part of the seller, although there is more interactive manual work required on the part of the buyer in responding to various peer's price update requests, such as the evaluation of the quality of the peer before permitting it to update the price.

A further limitation is that the buyer can neither demand nor force the sellers to instantaneously compete amongst themselves by reiterating their pricing in real-time in a bid until the lowest possible price is determined, and on a twenty four-hour, seven-day per week basis. While the Kraft-IBM proposal will allow a seller to beat a previous low price, the bidder does not go back to have another opportunity to reduce the price further. This is more akin to a blind auction where a seller is forced to provide a price in vacuum with the hope to be right, but without knowing what other subsequent competitive peers are going to bid.

The buyer is also unaware of any additional discounts, coupons etc. available for the product at that time for each seller, which could well be a significant factor. As an example, at any point of time, a number of sellers typically have something on 'Sale'. Some of these are not even listed on-line. This forces the buyer frequently to go to stores and check-out the prices—a tedious, time consuming and clearly a non-exhaustive and locality constrained mechanism. The buyer, furthermore, may be eligible for a group discount (one or more than one) depending on its affiliations, such as AAA membership, corporate discount eligibility, etc. No comparison exists, however, to get the best price.

Even when the buyer finds an attractive price, moreover, frequently the buyer is not sure of the quality/reputation of some of the sellers and at times may be hesitant in buying from a potentially untrustworthy or unknown source. Some of the common concerns are:

Are they a stable business or fly-by-night operation?
Is credit card information safe?
Could someone abuse the buyer's credit card in the future?
What if the product needs to be returned?
Will they honor their commitment in terms of delivery time, quality of goods and provide support in case of a problem?

In the case of web crawler information, such as the earlier mentioned 'Shopzilla', the prices are listed from all the sellers, including both the most reputable and the unknown small operations. The sellers are often rated based on advertising dollars spent and by customer feedback that can suffer manipulations of ratings by unscrupulous sellers and buyers. The burden is partly on the buyer to look for such conditions, and entirely on the buyer in others.

In the case of the peer-to-peer network proposal, the burden is entirely on the buyer to find out how good the seller's reputation may be, which is actually a huge task considering that there are millions of potential sellers across the globe and there is no standard to measure their history. The buyer, furthermore, is forced to manage the entire auction process including the responsibility to ensure accuracy, fairness, authentication, support and other technical issues etc. in its execution.

As a very practical limitation, a buyer often has a fixed budget and is forced frequently to check the prices to find out if the prices are within the buyer's acceptable range. A buyer in Massachusetts, as an example, has no way of knowing if his/her budget price was matched for a short time window by an aggressive seller promotion in California. The buyer also has no way of ordering the product in advance if the price should fall below a pre-specified price in a pre-specified time frame.

Other situations where the buyer may miss opportunities, result from the fact that the conventional reverse auctioneer data base is updated at a much slower frequency when compared to special short-term sales, such as every 30 minutes. Even if a buyer were to be using a web crawler or directly looking at a specific site, furthermore, the odds of finding this information are very small since (i) the buyer would have to be looking precisely in that same time window at a specific seller site among hundreds or even thousands of them, or (ii) it also assumes that the 'Seller System' has made that information available on the web—also highly unlikely for such short-term promotional sales due to the current manual process involved in updating the information for a large number of items.

A buyer who spends considerable money in purchasing goods, in general, does not derive any benefit from historic purchase volume—an indication of purchasing power. The buyer household furthermore, (as an example, a family), also does not benefit from aggregated purchasing power. This is true for all the prior 'conventional' proposed solutions.

The buyer typically selects one item at a time and goes through the above process when buying multiple unrelated goods from different sellers (or multiple same-type goods to be delivered at different addresses) such as one camera, two suitcases, six chairs, etc. as part of a 'Holiday List Shopping'; also referred to herein as a 'Shopping Portfolio'. These procedures are, thus:

clearly very time consuming;
the buyer gets no benefit for buying multiple units of the same type;
the buyer does not derive any benefit of aggregated spending on all these unrelated goods together as one entity (Shopping Portfolio) even when it represents a good size sum;
the problem gets worse if these unrelated goods need to be delivered to different addresses;
forced to go from on-line store to on-line store, one at a time, in the case of web crawlers; and
the buyer has no way of knowing how much the total price has changed for the entire Shopping Portfolio over a period of time without going through this cumbersome manual process repeatedly and on a periodic basis.

The buyer is, of course, not aware of any contingencies that may be attached to an offer from the seller. As an example, a bank making an attractive interest rate offer on a CD may keep it valid only for a few hours—perhaps not sufficient for the buyer to make the decision; whereas, another bank with a slightly higher rate may keep the offer open for several days. Another contingency example may arise where a computer chain sells laptops for $150 each, provided the buyer purchases a one-year membership for 'AOL', costing $200. This may be acceptable for some buyers, while not for others.

After having made the purchase, moreover, the buyer also has no easy way of knowing if the prices may have dropped further in a pre-specified time frame (e.g. 10 days) making it eligible for credit from some sellers as per their policy. The buyer has no easy way of specifying or knowing the delivery time; and even when such is promised, many times the commitment is not kept. An example is a seller promising to make delivery by December 18th, but never makes it even by Christmas.

Today's buyer typically gets subjected to unsolicited promotional events and advertisements that cause annoyance and are a disincentive to on-line shopping—particularly since the buyer does not have an easy way of specifying those types of promotional events and advertisement that are of actual interest to the buyer.

In addition to the above-described constraining of the buyer, these prior art processes also impose a further number of limitations on the 'Seller System' as they strive to meet the buyer's need for the best deal. Such limitations are now addressed.

Prior Art Seller Limitations

Generally 'Seller Systems' are provided neither with the opportunity to respond instantaneously on a twenty four hour, seven day per week basis to bid competitively in real-time for the buyer's 'Request for Quote', nor the ability repeatedly to re-bid in real-time, thus being forced to operate largely in their own silos. In the case of the Kraft-IBM approach, a seller does, however, get an opportunity to provide a competitive price when compared to the previous peers through which this request has traveled. The current peer, however, has no way of knowing what the next set of peers down in the chain will do, thus effectively reducing the advantage dramatically. As the process is not re-iterated, it is very akin to other current proposed solutions. The inherent and unpredictable delay of a peer-to-peer network coupled with its active manual intervention requirements also render its real-time aspect ineffective, and its response time entirely non-instantaneous.

The seller systems generally update the pricing information in the databases of the conventional reverse auctioneers on a daily/weekly/monthly basis. This process thus tends to inhibit short term (such as, for example, a half hour) discounting opportunities on-line. In the case of the Kraft-IBM model, there is a very small possibility that a buyer may by accident hit a peer in the same time window when a promotion is being offered. As an example, if a 15 minute 'Hot Sale' was being offered by a seller, and a request comes down the line within the same window, the buyer may take advantage of it. If, however, the window is not hit due to the inherently slow peer-to-peer network, the buyer will get no benefit at all, and the seller is unlikely to receive a sufficient volume during the sale. Furthermore, even if a buyer hits the window and gets a fabulous price, and no other peer down the chain is able to match such price, the seller system may not be able to honor it because the window of opportunity to complete the transaction may already have closed.

A number of such conventional reverse auctioneer systems email the seller when a 'Request for Quote' is made, thus requiring extensive and expensive dedicated human resources to respond manually in non-real-time and on a case-by-case basis. Obviously, these resources can be overwhelmed depending upon the demand, and they are prohibitively expensive to scale.

This email-driven or other human-injected process, in addition, severely limits the number of possible transactions; at best, to the order of tens of transactions per hour per person—a process hampered by human limitations. This significantly increases the seller's manpower and associated expenses and also creates inefficiency in the inventory management, especially if a product is in high demand.

The seller has to maintain dedicated staff, in addition, to watch market dynamics and frequently check competitive prices across a small number of perceived competitors, while still leaving hundreds or thousands un-responded to and unattended. Considering the magnitude of the problem, thousands of items need be tracked across hundreds of other competitive suppliers, and then correspondingly appropriate changes are to be made. This task is incredibly cumbersome and next to impossible, even on a non real-time basis. It is also extremely expensive, very time consuming and sluggish in responding to market dynamics.

For most sellers, if not all, the expenditure of maintaining such extensive manpower resources is too high and as a result, the pricing offered tends to be more in silos, slow moving, and frequently out-of-step with others—a direct result of lack of sufficient resources due to the sheer magnitude of the task and economic constraints on requisite resources. Thus, the price updates are largely manual efforts. Since all the sellers are in the same boat, however, this helps in preserving the status quo, though at the cost of not being able actually to provide a lowest possible price to the buyer. It also unfortunately inhibits the desirable growth of a new breed of efficient small on-line sellers willing to compete aggressively, pro-actively driving the market to grow their business and build a loyal customer base.

This problem is even worse when the price of the goods is relatively low, such as a song for 99 cents, or a movie or video show download for a couple of dollars.

The seller also needs to maintain resources on a twenty four hour, seven day per week basis, making it even more expensive; or, in the alternate, does not respond to emails and thus loses business when a request is made outside of nominal working hours.

The sellers have no easy way of knowing, moreover, if they have been consistently losing out on a pricing basis (as an example, a seller losing out in last 50 or 100 price quotes or auctions), even if by a small margin, and thus need to make a price change. All the prior art 'conventional solutions', including the Kraft-IBM system, indeed, face this same challenge.

Additionally the seller also does not know if the buyer in general is a frequent buyer of goods—also a universal problem across all prior art 'conventional' approaches.

The purchasing power or overall purchasing history of the buyer, or of the buyer's affiliates, such as his/her family is also unknown to the seller. This is also a common problem across all the prior art 'conventional' proposed solutions.

The seller, moreover, also does not know if the buyer is also interested in buying other goods at the same time, or their respective dollar volumes, and is thus forced to provide pricing independently for each product, one product at a time, instead of offering a group price. This is also a common problem with all prior art systems.

There is also no way for the seller appropriately to adjust its pricing for volume discount without manual intervention.

Additionally, the seller has no way of knowing the buyer's budget and the seller has no means of reverting back to notify in real-time if the price of the goods has dropped to match the budget. For example, sometimes manufacturers provide factory rebates to retailers who then turn around and further discount. This may bring the pricing within the buyer expectations at least for a short time. Unfortunately, however, sellers do not have, with prior art systems, means to provide such real-time notification, or to effect automatic consummation of the transaction.

The sellers are also in the dark as to how many such buyers are interested in buying at a specific price target. If known, this could be very valuable information.

The 'Seller System' additionally does not know if it is being out-bid by comparable players (players who tend to be in the same league or class e.g. large department stores such as 'Best Buy' and 'Circuit City'), or rather by small deep discounters who are low on service, or by a potential disrupter, or by someone in financial trouble. This is a common problem with the prior art.

The sellers additionally do not know if other bidders in the reverse auction are in the same 'Class of Sellers'. In the peer-to-peer approach, every seller is a peer and no distinction is made among peers that may guard against price quotations being manipulated by unscrupulous seller. As an example, a peer node may deliberately bid a low price to disrupt the process, while having no actual intention of serving the buyer, and under circumstances where there is no mechanism to enforce such bid.

The seller also does not know if the buyer tends to buy only from trustworthy established well-known names or is open to any seller. All prior 'conventional solutions' suffer from this limitation as well.

The prior art, indeed, neither has the ability to know if the buyer is willing to receive 'Contingent Bids' nor the ability to make automated 'Contingent Bids'. As an example, if a seller wanted to sell an extremely low priced cheap laptop provided the buyer purchased a one-year membership for 'AOL', there is, no way of communicating this.

The sellers of the prior art approach, furthermore, have no ability to offer 'Customer Specific Promotional Events' on a real-time basis, or to create 'Automated Promotional Marketing or Selling Events' in real-time based on current market conditions, or to create promotional marketing or selling events in real-time based on geographic locations. Small sellers also lack the resources to compete with larger players due to very limited on-line advertising budgets, even when one is extremely efficient and aggressive.

It is now in order to review the limitations also residing in the prior art approaches to the 'Reverse Auction', itself, which, as earlier pointed out, is actually a misnomer for such prior systems.

Prior Art so-Called 'Reverse Auctions'

As previously noted, the prior art so-called 'Reverse Auctioneer' maintains generally stale pricing information in so far as providing a quick and up-to-date real-time price response to the buyer is concerned.

Such prior art systems, moreover:
Cannot hold on-demand iterative reverse auctions without advanced notice.
"Shopzilla"-like systems cannot even hold real-time 'Reverse Auctions' at all.
No ability to provide 'Virtual Private Reverse Auction' to buyers such as large enterprises.
No capability to track or harness the purchasing power and purchasing history of the buyer.
'Reverse Auctioneer' does not have the ability to monitor and preserve the buyer's privacy. The buyer has to manage its own privacy concerns and rely on the Seller System's privacy policy.
'Price Watch & Automated Purchase' option is not available.
No ability to monitor or communicate the total price of a 'Shopping Portfolio'.
Some so-called prior 'Reverse Auctions', such as proposed by Kraft-IBM, do not use an independent 'Reverse Auctioneer' and the burden of "auction" is shifted to the buyer.
The buyer is responsible for holding the auction and enforcing the results.
The buyer also assumes the responsibility of keeping track of quality of the sellers' practices.
Privacy of buyer is not maintained.
High exposure to unsolicited promotions/offers/advertisements.
The buyer is expected to be technically savvy and able to maintain such system.
Extensive redundancy and fault tolerant requirements on the buyer's side, any failure jeopardizing the auction.

In accordance with the present invention, on the other hand, substantially all of the above-discussed limitations of prior art systems and proposals for on-line transactions have been rather remarkably overcome—indeed providing perhaps the first adaptive real-time method of and system for real-time iterative commercial reverse auction transactions over the Internet—and automatically at that, with no manual intervention required.

OBJECTS OF INVENTION

A primary object of the invention, accordingly, is to provide such a novel and improved method and system of, and apparatus for, enabling automatic real-time iterative commercial transactions over the Internet in a multiple-buyer, multiple-seller marketplace, optimizing both buyer and seller needs based upon the dynamics of market conditions, and not subject to the above-described and other limitations and disadvantages of prior art systems and proposals, but that more truly emulate free-market interactions amongst multiple buyers and sellers of products and services.

Another object is to provide a novel and innovative system architecture for the above purposes which simultaneously optimizes the needs, desires and requirements of both buyers and sellers in real-time 'Reverse Auctions'.

A further object is to provide such a novel architecture that enables a fully automated real-time twenty four hour, seven days a week Internet 'Reverse Auction' requiring no manual intervention and wherein sellers iteratively and automatically bid in real-time and on-demand to be the best price supplier of the goods or services to a prospective buyer.

An additional object is to provide such a new system wherein the bidding is in response to a specific buyer profile rather than just a generic buyer request, and that forces the sellers to tailor bids to the specific buyer profile under current market conditions and trends, and further to apply best price discounts or other incentives to win the buyer's business, and with the buyer also having an option for choosing the class or classes of sellers desired.

Still another object is to provide novel 'Seller System' automatic seller-engines with novel adaptive real-time iterative computation facility, for responding to buyer requests to quote and/or to generate reverse auction seller iterative bidding to generate a best bid.

Other and further objects will be explained hereinafter and are more particularly delineated in the appended claims.

SUMMARY OF INVENTION

In summary, however, from one of its important aspects, the invention provides a novel method of and system for conducting adaptive real-time iterative commercial transactions (buying and selling) over communication networks between prospective buyers and willing sellers through an intermediate automatic reverse auctioneer controller that automatically enables the sellers automatically to bid and re-bid iteratively in real-time for the buyers request and in the light of real-time market information in order to compete for the business of the buyer while the buyer may still be on-line or over an extremely short time period and including satellite world-wide-web communication—all such, for convenience, being embraced herein by the term "Internet" in its broadest sense, wherein the invention may be used over any public and/or private communication network using wireless and/or wired transmissions.

The invention includes a method of conducting a fully automated on-demand instantaneous and real-time reverse auction for products and services over such communication networks wherein buyers request a reverse auctioneer controller to solicit from seller quotes and iterative automatic competitive bidding amongst the sellers in order to become the best-price supplier for the buyer, the method comprising:

buyers initiating on-line network requests to a reverse auction controller for soliciting quotations on identified products or services and/or for conducting a reverse auction amongst the sellers and including in such request, specific unique individual buyer profile information;

automatically processing such request(s) at the reverse auction controller and immediately forwarding the same together with the buyer-specific profile information over the network to a plurality of sellers each having respective automated seller engines containing information data unique to the seller's individual business model-driven constraints and to real-time market data;

upon receipt from the reverse auction controller of a buyer's request and profile, dynamically and automatically generating in each seller's respective engine, a unique bid quotation tailor-made for that buyer and based upon that buyer's specific profile, the prevailing market conditions and the competitive environment, and transmitting the bid quotation automatically back to the reverse auction controller over the network;

causing the reverse auction controller thereupon to process the bid quotations received from the sellers, and to set the sellers into automatically competing amongst themselves, for iterative better bids using the current best bid quotations as a basis for further successive automated rounds until only a best bid quotation remains, and with the reverse auction controller matching the best bid with the buyer's request in real-time and without any manual intervention;

and enabling execution of the buyers purchase at the best bid.

Preferred architectures, best mode-designs, apparatus and embodiments are later described in detail and in connection with the accompanying drawings.

DRAWINGS

In the accompanying drawings,

FIG. 1 is an overall system diagram of the automated real-time iterative system sometimes referred to herein by the acronym "ARTIST", for on-demand communication network (such as 'Internet') transactions between buyers, sometimes hereinafter referred to as a 'Buyer System', and sellers sometimes hereinafter referred to as a 'Seller System', and the intermediate reverse auctioneer controller also synonymously herein sometimes called the intermediate reverse auction controller ('RAC') in accordance with the preferred embodiment of the present invention, automatically conducted with seller-automated engine implementations, sometimes referred to by the acronym "SAEJ";

FIG. 2 is a functional flow diagram of what may be termed a Buyer System "state machine" for the implementation of the Buyer System side of the architecture of FIG. 1;

FIG. 3 is a chart detailing the buyer profile information and product buyer data supplied by each buyer to the reverse auctioneer controller of FIG. 1, as more detailed in FIGS. 11 and 12;

FIGS. 4, 5 and 6 are successive functional flow diagrams in illustrating the sequences of steps performed by the reverse auction controller of FIG. 1;

FIG. 7 is a further functional flow diagram of the sequence of the operational steps involved in the operation of each seller automated engine, SAEJ, in which the acronyms used in the steps of FIG. 7 and implementing the reverse auction, are identified in the table of FIG. 8;

FIG. 8 is a table identifying the acronyms used in the steps shown in FIG. 7;

FIG. 9 is a block schematic and implementation circuit diagram of a preferred illustrative adaptive real-time iterative computation engine (so-called 'ARICE' architecture) of each seller automated engine SAEJ, with the numbers applied to the components in FIG. 9 being identified by the legends of the table of FIG. 10;

FIGS. 11 and 12 are illustrative buyer profile and information field packet formats and legend identifications, respectively, to be supplied by each buyer to the reverse auctioneer controller or, as time goes by, by the seller or the reverse auctioneer controller in accordance with the invention, and useful for each of the initialized, modified or intermediate, and processed situations.

FIG. 13 illustrates in its parts (a)-(d) the recovery of a buyer system subjected to a failure or fault during operation;

FIG. 14 is a similar diagram illustrating in parts (a), (b) and (c) the steps taken by the RAC to use checkpointing and rollback recovery to recover from a failure occurring in its operation;

FIG. 15 is a similar diagram illustrating in parts (a) and (b) an embodiment of how the RAC may use redundancy to increase its availability;

FIG. 16 illustrates the fault tolerance preferred architecture of the invention showing the components of a single SAEJ; and FIG. 17 shows suitable redundancy techniques useable by the SAEJ for availability improvement—parts (a) and (b) showing the use of two running SAEJ units for a hot-standby operation; while part (c) illustrates a modification using three SAEJ units for achieving redundancy through SAEJ replication.

DESCRIPTION OF PREFERRED EMBODIMENT(S) OF THE INVENTION

An illustrative and preferred architecture (ARTIST) of the invention is presented in FIG. 1 for simultaneously optimizing the goals of both buyers and sellers in its real-time reverse auction aspect.

The 'Buyer System' implementations, for illustrative purposes, are shown to the left in FIG. 1 as any one of, for example, a buyer laptop computer, desktop, PDA or cell phone computers, in on-line connection over the conventional world-wide Internet (illustrated by heavy lines) with a reverse auctioneer controller (RAC). As summarized, the key features of the buyer's participation, involve on-demand and real-time operation, the providing of unique buyer shopping portfolio and profile, specific buyer quotes, and the ability to select desired seller classes.

At the seller side, shown to the right in FIG. 1, illustrative custom hardware, server farms, computer work-stations or mainframes may be implemented with the 'Seller System' seller automated engine implementations 'SAEJ' of the invention and are shown connected over the conventional world-wide Internet (dark lines) to the RAC.

As summarized, the key features of the seller's participation reside in fully automated bids in real-time, iteratively and automatically modified in accordance with the customer (buyer) specific profile and the current market conditions.

In response to a new buyer registration in the process, or to a profile change as indicated in the upper left of FIG. 2, profile data of the type listed under B2 in FIG. 3 is provided for transmitting over the Internet to the reverse auctioneer controller RAC at the box labeled "Transmit to RAC". Respective requests for quotes RFQ for reverse auction RFRA, for a price watch RFPW and automatic notification RFPWAN, for a price watch and automated purchase RFPWAP, and for bid result acceptance BRA, are all shown in the Buyer System state machine operation of FIG. 2, instructing at the respective boxes labeled "Transmit to RAC", the transmission over the Internet to the RAC. As also indicated in FIG. 2, the buyer input for a price watch as good quotes or reverse auction results are obtained, may include such items as target price, timeframe, notification, e-mail or device type format, telephone or SMS number, etc.

Turning now to the reverse auctioneer or auction controller (RAC) and its sequence of operation in response to buyer requests received at R1, as shown at the upper left of FIG. 4, the RAC processing is shown for the above-mentioned RFQ, RFRA, RFPWAN, RFPWAP and BRA requests that are transmitted by the buyer state machine of FIG. 2. The process items are for matching sellers, generating initialized unique buyer profile packets, and where there are process responses from seller automated engines SAEJ, for further processing as later described in connection with FIG. 6. Where reverse auctioneer controller timeout requests RACT are received, the SAEJ responses are processed. As shown in FIG. 4, when a bid request is accepted at BRA, the statistics are updated and the transaction is initiated (R1 at lower center).

The RAC operational sequences following the FIG. 4 receipt from the SAEJ sellers bid or quote responses at R2 are shown in FIG. 5, where R2 addresses each of any RFQ, RFRA, and RFPWAN or RFPWAP responses. For RFQ, responses received from all participating SAEJs are processed and, when all responses have been received, the quote responses transmitted over the Internet to the Buyer System. Statistics are automatically updated and transmitted back to the SAEJs. For RFRA responses R21, these are validated. The round-trip time computations are updated and when all responses from all participating SAEJs are received, further processing is continued at R100 in FIG. 6. As shown, the bid responses for the buyer's shopping portfolio are processed and optimized, with the 'best' bid computed and compared with the previous round of bids, and with the current 'best' bid sent to the SAEJ's for the next round of bidding. In the event that the ultimate best bid exists in the last round, the winning SAEJ is selected, the buyer and seller notified, and updated statistics transmitted for the records of the SAEJ's.

With regard to RFPWAN or RFPWAP responses at R23, these are shown processed in FIG. 6 as to information on the respective buyer's requested item(s), with the buyer(s) immensely benefiting by this forced real-time iterative competition among sellers.

More detailed description of the processing by each seller automated engines SAEJ is presented in FIG. 7, showing the automatic processing of the request data received from the RAC as above described, and the responses to the price watch list and timeout events and changes to ARICE parameters and to initialized and modified or intermediate buyer or customer profile packets.

As before described, the architecture of the invention enables fully automated, instantaneous, accurate and competitive quotes from sellers on a twenty four hour, seven days a week basis in response to an on-demand 'Request for Quote' from a 'Buyer System'. It also allows such systems to request at any time on a twenty four hour, seven days a week basis, a true instantaneous reverse auction amongst sellers, where fully automated seller engines SAEJ iteratively bid amongst themselves in real-time to provide the best bid—i.e. the lowest price for a product or service supplier or the highest banking interest rate CD, for example, or analogous service provider. Each seller engine, as earlier described, automatically responds with instantaneous iterative bids specific to: the unique buyer profile, to prevailing and historic market trends and to competitive dynamics, to the last round lowest bid, dollar and unit volume of the request, and to its own marketing/promotion strategy. The bids are dynamically generated to stay within the seller's unique business model-driven constraints; these constraints themselves being further automatically modified within pre-defined hard limits on a product-by-product basis based on historic market data and trend lines. This seller automated engine 'SAEJ' dramatically cuts down the need and associated substantial expense for manually tracking and comparing thousands of items across hundreds of competitors. The seller, moreover, also has the option to decline participating in bids other than within its own class of sellers in order to preserve and protect its own business model.

The buyers not only get instantaneous on-demand response to their requests, but, as before stated, also immensely benefit by this forced real-time iterative competition amongst sellers. Instead of getting a generic price, a buyer does better based on its own unique profile which includes purchasing history, dollar and unit/units volume of its 'Shopping Portfolio' and its willingness to accept promotions and advertisements. The buyer can also request that only certain class/classes of sellers participate in this iterative competitive bidding for the buyer's business based on its own comfort factor. The buyer also can set a price limit for its desired shopping portfolio, put it on price watch, and if and when matched, receiving notification or automatically effecting purchase, if so chosen. Furthermore, if the price drops even more within a certain time frame, the buyer is automatically notified as for credit.

Such automated on-demand instantaneous Buyer-Centric 'Reverse Auction' will allow the buyer to get the best possible price from multiple sellers, while enabling the same seller to iteratively and automatically compete in real-time for the buyer's business ('price' and 'value' are herein used interchangeably). In case of a buyer looking to buy a camera, for example, the desire is to get the lowest price; on the other hand, a buyer wanting to deposit money at a bank for a year-long CD is looking to get the best rate of interest. The goal is to get best prices for the buyers and yet optimize the revenue/profit for the sellers by enabling them to evaluate the buyer demands in real-time and with the corresponding ability automatically to respond to various situations instantaneously without any manual intervention, based on pre-defined variables and constraints. Such a system of the invention has the following characteristics.

Summary of Automated on-Demand Instantaneous Buyer-Centric 'Reverse Auction' of the Invention As above-described, in connection with FIG. 1, the three key elements of the automated 'Reverse Auction' systems of the invention are (1) the 'Buyer System' where the requests for action originate and where there may be hundreds of thousands or even millions of such buyers; (2) the critical 'Reverse Auctioneer (Auction) Controller' RAC which is the control point for the entire process residing at its 'Reverse Auction Service Provider' ('RASP'); and (3) the 'Seller Automated Engine' SAEJ for each of the sellers who indeed could number hundreds of thousands or higher. Most of the communication happens between the 'Buyer System' and 'Reverse Auctioneer (Auction) Controller', or between the 'Seller Automated Engine' and the 'Reverse Auctioneer (Auction) Controller', with direct communication between 'Buyer Systems' and 'Seller Automated Engines' likely to be kept minimal, subject to the RASP business model.

A typical scenario involves a 'Buyer System' making a request to the RAC for either obtaining a 'Quote' or to conduct a 'Reverse Auction'. The RAC immediately initiates the process and can work in real-time in conjunction with the matching SAEJ to execute the desired request even while the buyer waits on-line. The goal is to deliver the best pricing to the buyer by engaging a very large pool of SAEJs armed with real-time market data to compete amongst themselves, such that the lowest price from the last round is used as a basis for the successive round, with the intent to improve or better it further. This process is repeated until only the winning bid is left and other participating SAEJs have bowed out. In accordance with the invention, moreover, this real-time task is accomplished automatically without any manual intervention whatsoever.

An important feature of the invention resides in its approach wherein, unlike prior art systems, each SAEJ keeps its own pricing data, being thus able dynamically to generate its unique prices tailor-made for each buyer based on the buyer's unique profile and shopping portfolio and prevailing market conditions and the competitive environment.

The details of the steps each system takes will now be described, with all three systems working in parallel, independently of one another and yet working automatically in conjunction with one another. The flow of the events in the reverse auction architecture is illustrated in FIGS. 2 through 8, with FIGS. 2 and 3 illustrating the 'Buyer System State Machine', FIGS. 4, 5 and 6 illustrating the RAC sequences, FIG. 7 illustrating the SAEJ sequence, and with FIG. 8 defining the acronyms used in the figures.

While a preferred embodiment of the SAEJ adaptive real-time iterative computation engine (ARICE) will later be described in connection with FIGS. 9 and 10, sufficient detail has already been presented now to address the operation of the system of the invention.

'Buyer System' Events

There are generally two types of buyers; one is the primary buyer who sets up an account with the reverse auction provider 'RASP' and has the ultimate responsibility for payment. There are also affiliated sub-buyers, such as family members. An example may be a family where the mother is the primary buyer and the father and the children are the sub-buyers. The primary buyer is authorized to admit sub-buyers in its account, each with their own Buyer IDs. Since in general, there is no basic difference between these two types of buyers from the 'RASP' perspective, the common term 'Buyer' or 'Buyer System' will be used for either.

When a first time primary buyer registers with RASP, the information is used to create the before-described unique buyer profile along with the list of its sub-buyers. The profile can be updated at any time. Each sub-buyer will also have its own respective unique profile, and also be updatable by their respective owners at any time.

Typical information fields are illustrated in the customer data packet format of FIG. 11 (legends in which are identified in FIG. 12) and may include name, address, email, telephone numbers, credit card information and other relevant personal details. Requisite details to compute 'Consumer Index Number' (CIN) or 'Consumer Index' is defined and updated by the RAC to assist the SAEJs to offer prices better than generally available and commensurate with and specific to the customer profile. Such also enables each SAEJ to do targeted advertising, assuming the buyer is interested, providing a win-win situation for both the buyer and the seller. The CIN reflects the aggregate view incorporating not only the primary buyer but also the sub-buyers profile underneath it. This gives the family an ability to pool buying power to get optimum pricing from the SAEJs.

The CIN is based on multiple factors including, but not limited to, a. Long-term purchasing history—the amount of overall dollars spent on an aggregate basis in a pre-specified time; as an example, last 12 months or in a calendar year across various types of SAEJ for both primary buyer and each sub-buyer, if any.

b. Short-term purchasing history—the amount of overall dollars spent on an aggregate basis in a pre-specified time, such as the last month across various types of SAEJ sellers for both the primary buyer and each sub-buyer, if any.

c. The types or classes of sellers from whom the purchasing was made in both long-term and short-term time frames for both the primary buyer and each sub-buyer, if any.

This information helps to identify a customer who primarily buys from lower or medium end stores such as a 'Wal-Mart', or a distinguished high end store such as 'Bloomingdale'; or a buyer of, say, 'Sony' versus 'Panasonic'. Other data, such as dollars spent on off-line shopping and consumer personal information may be provided where the buyer is willing, such as age, employment, wages, net asset value and so on.

The 'Consumer Index' rating, such as a category 'A2', may identify a buyer who spends significant money and/or has significant purchasing power and may spend more in the future, and tends to spend money in mid-to-high end stores such as 'Macys'.

On the other hand, 'A3' may mean a strong purchasing capability, tending to buy more from 'Wal-Mart' type stores. The Consumer Index Number may also be downgraded if a buyer's behavior has been less than exemplary, such as a buyer who did not pay, even though agreeing to complete the transaction, etc.

d. Any group-based discount eligibility based on affiliations such as 'AAA' membership, or a large company employee eligible for corporate discounts.

e. A need for notification if the item purchased drops in price within a few days of purchase. Some sellers have a policy of thereupon providing credit to the buyer in such a scenario.

f. Willingness to receive promotions/advertisements from an SAEJ seller who provides the successful bid for a pre-defined time frame, thereby enabling sellers to target specific advertising and other promotional events. This voluntary acceptance can result in better pricing to the buyer.

While a minimum pre-defined duration can be specified by the RASP, a higher amount can, however, be chosen by the buyer and can further reduce the price offered by the SAEJ. Examples of promotions/advertisements include such items as movies, electronics and clothing, etc.

The willingness of a buyer to receive promotions and advertisements from RASP for buyer-selected categories can be expressed in return for compensation such as an automatic pre-defined percentage cash back of the total dollars spent in the selected categories, at the end of each year. Such promotions may be received on various types of devices including any wireless or wired equipment, hand-held or otherwise, and a variety of formats, as illustrated in FIG. 11.

Other information can also be provided on a case-by-case basis or may be stored in profile to be used until changed. Such may include requests for competitive prices from all the SAEJs; or in the alternative, such price requests from only a selected class of sellers for each type of product, again based on the buyer's personal comfort factor. As for the buyer's selection of a class of sellers, this may be defined by the RASP based on criteria such as the seller's financials, dollar volume of business, reputation in the market place, service, support, ability to meet delivery commitments, longevity in business, revenue growth etc. A well-known department store chain, for example, may be in a 'Class A' as distinguished from a new small store with low volume and a relatively unknown track record which may be initially placed in a 'Class D' or the like. As the volume of this new store increases, its class may be upgraded. Conversely, if the volume of business for a 'Class A' seller decreases below a threshold, or the number of consumer complaints are above normal (the class and category are interchangeably used in this context), the class category may be downgraded.

This also helps keep the unscrupulous sellers out of the play. Instead of specifying a seller's class for each type of good, moreover, a buyer may choose to specify a common class across all product types. A combination of 'classes' may also be specified such as, for example, 'Class B' and 'Class C' for 'Quotes', and/or for 'Reverse Auction', with different classes for 'Request for Quote' and for 'Reverse Auction'. There is also the flexibility for the buyer to specify the number of lowest price SAEJ's results that are to be considered, such as only the five lowest price sellers.

While a buyer certainly does not have to provide all of the above-desired information, the more that is provided will enhance the chances of getting an optimum deal from the SAEJs.

After registering, or after updating the profile if already registered, or if already registered and no profile updates are required, the buyer then proceeds to the next step. The buyer may then either request competitive pricing or quotation, or request a 'Reverse Auction' amongst the sellers ('BAR'), FIG. 11. The competitive pricing request, as previously explained, may be for a single, or for multiple products of the same type, or for multiple unrelated products.

The following events then occur as shown in earlier-discussed FIGS. 2 and 3 and in the data packet field of FIGS. 11 and 12.

If the buyer makes a 'Request for Quote', ("RFQ", FIGS. 7 and 8 and "BAR" in FIGS. 11 and 12), the buyer has several fields from which to choose and to specify or fill out. These fields may be specific to each type of product itself (B3, FIGS. 2 and 3). Consider, as an example, the case of a buyer interested in buying a digital camera, an ice cream maker, and a prescription medicine. The information required for the first two items of such requests may be: type of product, its naming nomenclature, manufacturer, model number if known, etc., as at "PROD INFO", FIGS. 11 and 12. In the case of the medicine, its name, refill number, physician's name, etc. The number of units to be purchased will be specified and an acceptable delivery time is also to be provided ("DLV INFO").

On the other hand, a request for competitive interest rates for a credit card may require the following type of entry: product specific option field entries as to the requested credit line and other relevant information, including buyer willingness to accept a 'Contingent Bid' from the SAEJ ("REQ INFO, FIGS. 11 and 12). Such a 'Contingent Bid' may be offered by the SAEJ, for example, by making the bid subject to 'Credit Verification', or a similar situation may happen when requesting a mortgage quote or the like.

The following additional information may also be requested for each product type if available in the buyer's profile, ("B2", FIGS. 2 and 3), with the option for the buyer to make any per-product changes required, and with selection of classes of sellers eligible to bid on the product (B3, FIGS. 2 and 3; "REQ INFO", FIGS. 11 and 12).

Information relating to all or some of the following is also pertinent: any seller coupons;

geographic location/locations of physical delivery and delivery means, or electronic address for digital content delivery download such as video or music, etc.; and information to assist in calculating shipping and handling charges, or to assist in delivering digital content; also to assist the SAEJs in determining if the specified location is covered. As an example, a mortgage company may be focused on a region rather than the entire country.

This information is then immediately processed by the RAC, communicated to the matching SAEJs (this also depends on the 'Class of Sellers' chosen by the buyer) which then instantaneously automatically compute the price specific to that particular customer profile, dollar volume, product specific pricing history, current market dynamics, recent competitive environment, etc., and then submit it back to the RAC. These quotes are then analyzed and presented in the order requested by the buyer in real-time while the buyer may still be on-line. This entire automated process may take from tens of seconds to a few minutes; not the hours or days of prior systems. Thus it eliminates the issues related to stale pricing/delivery or other types of product specific information. It also eliminates the delay in getting this information, and, of course, speeds up the delivery time concerns since only those SAEJs that are willing to meet the requested delivery time will respond to these requests.

Having received the requested quotes, the buyer then can choose to do nothing at all, to place an order to the "best quote" seller within its quote validity duration or to another desired seller, or to request a 'Reverse Auction' among sellers. It should be noted, however, that it is not necessary to go through the quote process; the buyer may just request a 'Reverse Auction' right from the start. If this is the route selected, the buyer may be required to pay a small fee; or an alternative may be to require the buyer to purchase the product so long as the final price, as an example, is 80% or less of the lowest quoted price.

The buyer fills out the requisite data packet information as mentioned above, including updated address/addresses where the unit/units will be shipped. The buyer may change parameters such as the 'Class of Sellers', 'Volume' etc. if so desired. After receiving the quotes, the buyer may decide to change the volume or type of goods and corresponding information such as delivery address, etc. If the lowest quote for a Sony digital camera was $150, for example, the buyer may choose to buy three cameras instead of the original request to quote for two units; on the other hand, if the lowest digital camera quote was $250, the buyer may keep the number of units to two or even reduce the order to one.

The invention also enables the buyer to request a 'Price Watch & Automated Notification' as earlier mentioned, as when prices fall to or below a certain level. This may also happen after the above-mentioned 'Reverse Auction' request.

If a buyer selects this option, it is provided with an additional field with a 'Target Price' and the 'Time Frame' to keep that watch alive. If no duration is filled out, then it is assumed to be the longest time frame permissible by the RAC—as an example, this could be six months. The buyer may also provide the requisite information for the notification, such as email, SMS, or other means as specified.

The buyer may also, as before mentioned, request 'Price Watch & Automated Purchase' when prices fall at or below a certain level in a pre-defined time frame. This could also happen after the above-mentioned auction among sellers. As an example, if the price of a specific digital camera fell below $150 in three months, the buyer is notified and the purchasing transaction is automatically initiated. This enables the buyer to take advantage of short-term promotional events, even when the buyer may be busy or unavailable to respond to the notification in a timely manner.

The buyer will also be receiving the progress feedback as the requested task is executed in the background among the RAC and a number of SAEJs.

'Reverse Auctioneer Controller' (RAC) Events

The 'Reverse Auctioneer Controller' RAC processes the buyer information presented and updates the records if the profile has changed. The RAC then processes the specific request made by initializing a pre-defined multi-field packet with the customer profile including its consumer index number CIN, as shown in FIGS. 11 and 12. For each product, it also includes: product specific information fields (PROD INFO), delivery address and acceptable delivery times (DLV INFO), the specific buyer action request (BAR) etc. The packet also has control fields such as Time Stamps (RACTS), RTT, (round trip time), error codes (ERROR), diagnostics codes (DIAG), checksum (CHKSUM), forward error correction (FEC) etc., as shown.

In case an enterprise buyer wants to have a 'Private Reverse Auction' among pre-selected partners/suppliers, this may also be initiated by filling in the 'Virtual Private Reverse Auction ID' (VPRA ID), thus signaling such desire. The VPRA ID is a unique ID agreed to between the buyer and the RAC that identifies the 'Private Reverse Auction' to all the parties (Buyer System, RAC and SAEJs). In this case, the multi-field packet is only communicated to the selected list of sellers and to no one else.

Whether a 'Reverse Auction' or a 'Private Reverse Auction' is involved, the process is largely the same except that the choice of sellers in first case is decided by the RAC, whereas in the second case, it has already been decided by the buyer. This multi-field packet at this initialization stage is called the 'Initialized Customer Packet', FIG. 11. After preparing such an 'Initialized Customer Packet', the RAC immediately communicates it to the matching SAEJs, depending upon the class of sellers chosen by the buyer, or the actual sellers that may have been pre-selected by the buyer in the case of a 'Virtual Private Reverse Auction'. Each such SAEJ then instantaneously and automatically computes the price specific to the customer profile, dollar volume, product specific pricing history, current market dynamics, recent competitive environment, etc., and updates this packet and submits it back to the RAC.

In the case of a 'Request for Quote' (RFQ), the results are ordered and sent to the buyer as needed.

In case of request for a 'Reverse Auction' (RFRA), the RAC determines the lowest bids amongst the responses and updates the multi-field packet with the requisite information for the next round of the Reverse Auction.

As the process moves forward, and quotes or bids are successively generated, this packet is then updated by the RAC with information such as number of sellers bidding, bid number, type of bid, bid time stamp, lowest bid, etc. (BID INFO, FIGS. 11 and 12). Each participating SAEJ also updates this packet with its own new bid amount and its Seller ID etc. and at this stage this packet is called an 'Intermediate Customer Packet', FIG. 11. This packet evolves with more and more information being entered until conclusion. At the end, when there is nothing more to be done, the packet is labeled 'Processed Customer Packet'. This total process continues in real-time until the desired action is completed, and automatically, without any manual intervention.

In order to ensure forward progress of the reverse auction even in the presence of SAEJ and network faults that may arise, moreover, the present invention provides an innovative 'Reverse Auction Clock Tick' based timeout mechanism (referred to as 'RACT'). Bids must be received from all SAEJs, within the 'Reverse Auction Clock Tick' for the bid to be counted. 'RACT' is calculated using 'Round Trip Time' (RTT) between RAC and participating SAEJs, and the time-out is set based on this value. The setting of the time-out is programmable with options such that every 'Seller Automated Engine' can participate in each round; or a large number of SAEJs can participate in each round based upon a pre-defined percentage, thereby preventing a few very sluggish SAEJs from slowing every one else down.

The 'RACT' estimation is adaptive and is updated after each round. A novel mechanism incrementally adjusts the 'RACT' estimate of the bid responses based on the 'average' 'RTT' estimate from each SAEJ. Any bids received after the time-out will be discarded, allowing all SAEJs that are willing and able, to participate in the reverse auction. Under extreme network congestion or outages, not all SAEJs may, however, be able to participate. Each bidding round is therefore assigned an incrementing sequence number 'N'. The RAC will ensure that all the bids received for round 'N', contain the same sequence number N, thereby guaranteeing the consistency of the bids received, so that an old bid received in a newer session (possibly due to excessive network delay or packet reordering), is rejected.

Once a valid bid is received by the RAC, the submitting SAEJ is liable for that bid. This ensures that a seller cannot lower the price of the Reverse Auction, and then drop out in the final rounds. All this processing and the events, moreover, occur in real-time without any manual intervention, and require no dedicated manpower resources, thus tremendously expediting the process at a very little incremental cost.

Specifically and in summary, the following events occur, as shown in FIGS. 4, 5, and 6.

If it's a 'Request for Quote':

The RAC collects all the real-time responses from the desired seller classes for the customer profile-specific requests.

The system then processes such information as appropriate. For a single product type, this is fairly straight forward. For unrelated products, a later-described innovative mechanism is used, in accordance with the invention, to compute various combinations of received quotes to derive the optimized value for the buyer.

This post-processed information is then arranged in the manner requested by the buyer and then communicated.

Statistics are updated for market analysis; some examples, the number of requests as an absolute number, type of 'Consumer Index Numbers' corresponding to the requests, number of requests for each type of good and their corresponding 'CIN'—all as a function of time; the lowest quoted price in each of the categories as a function of time; and geographic distribution of 'Requests for Quote'.

If it's a 'Request for Reverse Auction':

The RAC uses the previous quote (assuming the buyer obtained it prior to requesting 'Reverse Auction') as the best starting bid. If no quote has been requested prior to the reverse auction, then no starting bid value need be provided. In an alternate embodiment, historic median price, or last consummated transaction price may also be a candidate.

The RAC processes the real-time response to the bid request from the participating SAEJs and determines the "best" bid in this round.

Subsequently, the SAEJs are asked to re-bid against this best bid (lowest possible price or highest possible interest rate as before discussed), offered in the last iteration. If the bid is not improved further by any seller, then the auction stops and the best bidding SAEJ wins the buyer's business. If, however, an improved bid is submitted, the process is repeated again in real-time, with consecutively successive better bids from participating SAEJs until only a single SAEJ is left for each of the goods; or each sub-category of the goods if unrelated goods were involved.

In the event there is more than one of the SAEJs that has bid the same lowest price, for example, then a proprietary policy may be used to resolve the "best" bidder. This may be a common occurrence for low price requests, such as for a song or a movie or a TV show download. Such a policy may, for example, be limited to a random number selection; or a round robin; or to the SAEJ that uses the most amount of advertising; or divided in proportion amongst various advertising sellers based on such considerations as advertising volume, etc.

The consummation of this transaction is then initiated and enabled between the parties and the statistics are updated for trend analysis; for example, the number of requests as an absolute number, the type of 'CIN' making the requests, the number of requests as a function of time, the pricing trends as a function of time for each class of sellers, the pricing trend as a function of volume, the pricing mean and the standard deviation, the geographic distribution of purchase, the overall quote-to-sell ratio across the board, or the quote-to-sell ratio specific to the SAEJ, and the like.

If it's a Request for 'Price Watch & Automated Notification':

The RAC then provides a running list of 'Price Watch' with a timer associated with it (RFPW previously described in connection with FIGS. 5-8). This list is always available in real-time to the SAEJs. If a quote is found to meet the Price Watch value, or the SAEJ notifies the RAC of its intent to match the request, the buyer is immediately automatically notified as specified in FIG. 6.

If it's a Request for 'Price Watch & Automated Purchase':

If a quote is found to meet the Price Watch value, or the SAEJ notifies the RAC of its intent to match the request, the buyer is immediately automatically notified (RFPWAP in FIG. 6 as before described). In case more than one SAEJ is willing to match, the 'Reverse Auctioneer Controller' may make the decision on a first-come-first-served basis or based on a proprietary policy.

In general, once the winner/winners are picked, the buyer and the winning SAEJs (for multiple unrelated goods) are informed and the transaction phase is started. The 'RASP' may or may not participate in this actual transaction between the buyer and the seller subject to its own business model. For the buyer who wishes to preserve anonymity, it may, however, be advantageous to have the RASP Auctioneer facilitate the transaction between the buyer and the seller. After the transaction is consummated, the 'Updated Processed Customer Packet' is sent to all participating SAEJs for their statistics collection.

'Seller Automated Engine' (SAEJ) Events

The 'Seller Automated Engine', SAEJ, as above described in connection with FIGS. 7 and 8, processes the buyer information and subsequently the bid information received from the RAC in real-time without any manual intervention. The central core element of the SAEJ is its 'Adaptive Real-Time Iterative Computation Engine' previously also referred to as 'ARICE', as shown in FIGS. 9 and 10 and hereinafter more fully described. This entire bid generation process is completely automated and thus enables the capability to respond to hundreds of thousands of buyer requests (or higher depending on its IT infrastructure) without any dedicated manpower—all as contrasted from the relatively small number of requests that prior systems are capable of handling (tens of requests per hour per dedicated manpower, for example). This results in the invention providing several orders of magnitude performance improvement with simultaneous reduction in manpower and associated operating expense, as compared to existing state of the art 'conventional' solutions.

The SAEJ of FIG. 7, after receiving the information from the RAC that has been submitted by the buyer (B2, B3, etc. of FIGS. 2 and 3 and FIGS. 11 and 12), processes and evaluates the same in the context of the customer request, its specific profile, long-term market trend and short-term market dynamics, all as previously explained, and involving, in summary, such information as:

types of goods requested, expected delivery time, volume, single delivery address or multiple addresses, consumer index number (CIN), willingness to receive targeted promotion/advertising and short-term discounting unique to the customer profile and corresponding promotional events such as a coming 'Sale Alert' notification that enables a much better return on per dollar of marketing expenditure than broad based advertising group discounts, any applicable coupons, geographic location of the buyer, helping in making geography-specific targeted promotions, the Requested 'Seller Automated Engine' Class/Classes, if any, any 'Virtual Private Reverse Auction ID', short-term competitive positions for its own class and other 'seller classes', long-term pricing trends etc. for its own class, and other 'seller classes'.

Assuming the delivery expectations can be met, the SAEJ makes a decision then to participate or not to participate. A 'Class A' seller SAEJ, for example, may choose not to participate when all categories of SAEJs are participating, or, when the region within which it sells is geographically constrained.

Assuming that the decision is to participate, then the following events occur as shown in earlier, described FIG. 7.

If it's a 'Request for Quote':

The price is refined using the earlier mentioned, but more fully later-described 'Adaptive Real-time Iterative Computation Engine' (ARICE), and various parameters including customer specific profile and market trends that will affect the dynamically generated output of this engine. Historic long-term market data affects the computation of the primary 'Base Value' for a product; whereas, the short-term market and competitive environment are used to 'Modulate' such primary 'Base Value' signal, as hereinafter explained. The final quote, along with its duration of validity, is then transmitted to the RAC. Additional information may also be attached to the device types specified by the buyer, such as information about the company, product and advertisement,—that is, if the customer has indicated a willingness to accept such.

If it's a 'Request for Reverse Auction':

The price or the appropriate product specific information is further refined using the previously mentioned adaptive real-time iterative computation engine ARICE. If a quote was previously provided for this request and it is still valid, and the underlying buyer parameters have not changed, then that data is used as a base line to make further, adjustments. If the quote is outside the valid duration or the underlying parameters have changed, then a different baseline is used, such as a more recent quote. In an alternative embodiment, the starting bid price may be provided by the RAC, based on either a valid quote or, in its absence, a recent transaction. It should be noted, moreover, that the parameters may change from the 'Request for Quote' to 'Request for Reverse Auction'. The buyer may have a time gap of days or weeks between the two events and the underlying market factors, such as market trends, may have changed. Historic long-term market data affects the computation of the 'Primary Base Value' for a product, whereas the short-term market and the competitive environment are used to 'Modulate' the 'Primary Base Value' signals, as more fully later described.

The above dynamically generated results from the engine are then communicated to the RAC which compares the information from the various SAEJs and then takes the better or "best" value for the buyer (lowest price in case of products, or the highest interest or other rate of a service) and requests the SAEJs to re-bid to improve or better the current "best" value. This process, as previously explained, is repeated in real-time for each SAEJ until the SAEJ decides not to renew/reiterate the real-time bid based on its pre-defined limits, in which case an explicit message is sent to the RAC indicating no bid. The packet is then time stamped, updated and saved for future statistics analysis; or alternatively, that seller wins the buyer's business. Again, additional information without any manual intervention may also be attached, such as information about the company and the product, and/or advertising if the customer has indicated a willingness to accept such.

If it's a Request for 'Price Watch & Automated Notification' (RFPW):

If the price can be matched in the specified time, the SAEJ automatically so notifies the RAC of its intent to match the request. The price watch provides visibility into the potential volume at a pre-specified price target. Although it is also possible to use RSS technology (Real-time Simple Syndication) to get price alerts, such would be a non-automated approach, thus neutralizing some of the major advantages of this system.

If it's a Request for 'Price Watch & Automated Purchase' (RFPWAP):

Again using its running list of 'Price Watch & Automated Purchase' with associated timer (FIG. 7), the SAEJ will determine if the price can be matched in the specified time, and the SAEJ will then automatically notify the RAC of its intent to match the buyer request, and requests the RAC to initiate the transaction. This provides visibility into the potential volume at a pre-specified price target and an opportunity to take advantage of it. Assuming a scenario, for example, where 500 customers have placed a Sony digital camera on such 'Price Watch & Automated Purchase' list with a price specified as $200, and the lowest bid price from any SAEJ has so far been $240, an aggressive SAEJ may take advantage of such an opportunity by offering a promotional event (even as short as a minute) at a $200 price tag for a much smaller profit, though a possibly higher volume, reflecting receiving higher volume discounts from the manufacturer. The SAEJ, furthermore, also earns the right to target future promotions/advertisements to those customers who have agreed to accept promotions/advertisements and raising the SAEJ profile at the RAC. This automatic promotional event may, if desired, be staged at a time of the day/night when competitive attention is likely to be minimal.

The SAEJ may also make a 'Contingent Bid' at a desired price, requiring the buyers to accept the future targeted promotions/advertisements, with the targeted advertisements also subsequently sold to other related suppliers, thus again enhancing revenue.

Recapitulation Summary

In recapitulation and by way of succinct further summary, at this point, the process or method of the invention is initiated by 1. a buyer filling in elements of various fields of a data information packet, including requested product or service identification and personal buyer-specific profile information where appropriate, and providing such to the RAC by way of a request for the initiation of a reverse auction amongst appropriate sellers in the RAC database, or just a request for price quotations from such sellers.

2. The RAC processes this buyer raw data information and adds additional information to fields of the submitted data packet such as an assigned consumer index, and, from its stored database of sellers, selects those that may match the buyer's product requests and forwards this "initialized" packet to such sellers.

3. At the seller end, initialized packet information is received and processed, and using the seller's SAEJ computer, automatically proceeds to update the packet by adding thereto the seller's price bid quotation, thereupon returning this now "intermediate" packet to the RAC.

4. The RAC automatically collects and processes the intermediate packets from the sellers, compares the received bids, and further updates the intermediate packet by adding thereto the lowest or best bid(s), thereupon returning such back to the sellers for a further round of price refinement or bettering of the price bids.

5. The procedure of step 4, above, is iteratively successively repeated for further round(s) until a final best bid is ultimately obtained by the RAC and the further updated packet containing such best bid is thereupon communicated by the RAC back to the corresponding buyer; and also communicated for statistical database purposes for each of the RAC and the bid-participating sellers—thus providing total visibility to complete pricing trends and marketing information as to all sellers, on a global basis, and without further cost. In this successive back-and-forth re-iterative bidding, each seller thus obtains the same buyer-specific packet field data which each seller has respectively supplemented with the seller's own bidding data, and ultimately, the final best bid—each seller thus making use of the same packet to create its own historical statistics.

6. The final packet containing the best bid is communicated by the RAC back to the buyer along with its corresponding seller information to enable the buyer to execute the purchase of the product or service at such best bid price. Additionally, the final completed packet is sent to all the recently participating sellers for statistics to be added to their databases of competitive marketing information.

7. As before explained, moreover, the refinements of the buyer using the packet to request target price and time frame in price watches, and for automated notification and/or automated purchase, are also enabled.

8. The invention thus enables the same data packet to be used by all for their respective needs—minimizing an explosion of required data packets; minimizing network; and minimizing the time the buyer must spend online.

It is now in order to describe a preferred architecture for the previously mentioned Adaptive Real-Time Iterative Computation Engine (ARICE) of the SAEJ.

'Adaptive Real-Time Iterative Computation Engine' (ARICE) Architecture

An architecture block diagram of this central core element of the SAEJ, as shown in FIGS. 9 and 10, uses both long-term and short-term market data-containing pricing, competitive impact, demand and supply, trend lines of various parameters, information on types of sellers winning the bids, etc. coupled with customer profiles, to dynamically generate pricing bid signals. This programmable, feedback driven, closed-loop engine automatically adapts to the constantly evolvinsg market conditions, and provides appropriate pricing corrections in requisite steps to meet the business goals, while still staying within the hard business constraints laid out by the individual seller.

A part of this engine architecture can most usefully be explained using a well-known AM/FM (amplitude modulation/frequency modulation) radio analogy. A high-frequency carrier signal is modulated by a low frequency voice signal in both AM or FM types of broadcast. In the case of AM, the amplitude of the carrier signal is modulated with the voice and the frequency remains unchanged; whereas in FM, the carrier signal frequency is modulated with the voice signal while its amplitude remains unchanged.

In the preferred 'ARICE' architecture of the invention, the hard constraints set by the seller (e.g. upper and lower price bounds for a product) define the range in which bidding prices are allowed to fluctuate. With the radio analogy, this is somewhat akin to a radio carrier signal. A unique 'Base Value Signal' is generated in real-time for the requested 'Seller Class' by using feedback of previously 'Processed Customer Packets', typically stretching back over a longer duration and which is programmable. Feedback data is processed to extract information, such as pricing trends as a function of time and volume, pricing mean and standard deviation, winning bid values of competitors and differences in margin with seller's own corresponding bid, seasonal dependencies, etc., and such data is coupled with generic market data such as currency fluctuations, etc. Relatively speaking, this signal changes slowly and can be somewhat analogously considered more like an AM (amplitude modulated) signal.

A unique customer profile-specific 'Modulating Base Value Signal' is generated for the requisite 'Seller Class' of the desired product. It represents the changes in the 'Base Value Signal' required as a function of Consumer Index Number (CIN), the buyer's willingness to accept promotions from winning sellers, the buyer's willingness to accept advertisements from the 'Reverse Auctioneer Service Provider' for selected categories, etc.

Recent short-term changes (of programmable duration) in market dynamics impact the price, such as newly introduced competitor generic promotions, supply-versus-demand transients, a competitor's attempt to aggressively unload inventory, a newcomer in the market wanting to grow aggressively, the termination of a competitor's promotion, the performance of all the competing sellers who won bids in the recent past (such as in the past eight hours), price differences in winning bids versus the SAEJ final bid in the recent past, the last few minutes of processed bids history, the last round "best" bid, etc.

Such information contained in the previously processed customer packets of recent vintage is extracted, processed, and fed back into the engine along with the seller's own recent performance, such as the winning ratio in reverse auctions, percentage of quotes with "best" price compared to the number of times quoted, the amount of volume shipped for the product, the overall revenue status in the month/quarter etc. versus expectations, inventory status, etc.

This modulating signal modulates the 'Base Value Signal', analogously similarly to FM radio modulation to produce a customer specific and finely market-tuned 'Value Signal', so-labeled in FIG. 9. The 'Value Signal' is then compared against the hard constraints (also called "rails") established by the seller and also driven by its business model. In general, the modulated 'Value Signal' should stay within these bounds and not saturate to the rails. If saturation does occur, then the bid is not renewed and a record is kept of such event. If the modulated signal is not saturated to the rails, however, then another modulation occurs in the form of a 'Promotion Event Modulating Signal'. The resulting signal is then used to compute the next round bid value, and such is subsequently communicated to the RAC.

'Price Watch & Automated Notification' (RFPWAN) and 'Price Watch & Automated Purchase' (RFPWAP) lists are also periodically checked to compute the potential volume and the corresponding offered price for a product and an opportunity for advantage, by offering a very short term promotion. If such an opportunity is detected, it drives the 'Opportunistic Promotion' signal of FIG. 9 as an input to the 'Promotional Event Modulating Signal' and it is also used pro-actively to notify RAC of its intention to meet the 'Price Watch' goals.

The principal conceptual difference between this engine and the radio analog, is that the invention operates as if both AM and FM are used in the same engine together. Thus, this customer profile-specific, adaptive, real-time feedback driven automated engine uses the historic and recent real-time market data as feed back, and the seller's business model parameters to enable instantaneously reiterating a more refined bid during a reverse auction. The engine is highly programmable with the seller setting a number of parameters such as constraints, water marks for various triggers, promotion events and schedules, etc. The ARICE-based SAEJ can process hundreds of thousands of transactions every hour—several orders of magnitudes higher than is possible with 'conventional' current solutions. This innovation, furthermore, enables the seller simultaneously to keep track of hundreds of thousands of competitors in real-time—an incredibly cumbersome and near-impossible task with 'conventional' solutions. The invention also dramatically reduces the seller's man-power expenditure and associated expenses, as well.

The details of each functional block of the novel ARICE architecture of FIG. 9 will now be reviewed. While the various functional blocks represents logical partition of the tasks, the actual circuit implementations may vary depending on the level of ASIC integration and the device technology (such as 0.09 micron etc.). Accordingly, some blocks may physically reside on one chip, or a block itself may be sub-divided into multiple chips as desired.

ARICE Architecture

The before-mentioned 'Initialized Customer Packet' from the RAC is labeled '101'. This initialized customer packet contains the customer profile, Consumer Index Number (CIN), action request, product information, 'Virtual Private Reverse Auction ID' and other relevant information previously described.

'Historic Processed Customer Packets' labeled '201' originate from previous 'Requests for Quote' and requests for 'Reverse Auction' and are processed along with '101' by a 'Pre-Processor Stage 1' labeled '202', which extracts and massages the data to provide market information to determine both long-term and short-term trends, as earlier described. 'Long-term trends' are one of the input variables to the 'Base Value Signal Generator'. These long-term trends for a product for each seller class are typically measured over a programmable pre-defined time—an example being a week, a month or a quarter or even on a longer time basis.

Short-term trends are processed by a 'Pre-Processor Stage 2' labeled '205' to create the 'Modulating Signal'. These are typically measured over a programmable pre-defined time, such as the previous 5 minutes, 30 minutes, 8 hours or several days, etc. Some of such short-term examples are: price impact of newly introduced competitor's promotions, supply versus demand transients, a competitor's desire to unload inventory, an aggressive newcomer in the market wanting to grow aggressively, and termination of a competitor's promotion.

Additional examples are: performance evaluations including the performance of all the competing sellers who won bids in the recent past, as in a pre-defined programmable time frame (such as, for example, the past 8 hours); conditions such as the consistent underbidding by a seller in the same class—possibly in financial trouble—in which event, the need to match its pricing is not desirable; price differences in winning bids versus the SAEJ final bid in a recent past, such as in a pre-defined programmable time frame. If, for example, the winning seller price (in the same class) was lower by a pre-defined number (as an example, 15%), it could be a signal of a price war and the need to take appropriate action, etc. The last few minutes of processed bids history is also important information, as is the Seller's own recent performance such as: the winning ratio in 'Reverse Auctions'—i.e. if the number of bids won in a pre-defined time frame is, for example, in a 90% range versus expectations of 30%, there may be room to increase the price. Or, if the number of bids won in a predefined time frame is, for an example, 10%, versus expectations of 30%, there may be need to adjust the price. Running promotional events in real-time, is important, including using such devices as short-term discounting as for an hour or so to create a momentum. Other considerations are percentage of quotes with the 'best' price, as compared to the number of times quoted; the percentage of quotes translated in the reverse auction; the breakdown of customer profiles requesting 'Quotes' or 'Reverse Auction'; the number of units shipped for the product as a function of time; the overall revenue status in the month/quarter etc. versus expectations, inventory status, etc.

Other considerations include geographic distribution of purchases and the answer to the question as to whether most of the requests are geography-centric; for instance, when faced with a natural disaster—implications of savings in shipping strategy; or are the consistent under-bidders overseas vendors instead of domestic vendors? Those from overseas may potentially be more constrained in other areas such as service, or may have higher shipping and handling costs; or may have true lower operating expenses. Is there a predictable pattern based on time of the year from different parts of the world because of religious/cultural preferences, indicating consideration for special discounts/promotions, etc. specific to those parts of the world? If a minimum threshold volume (number of units or dollar volume) is not reached in a certain time frame, there may be a need to adjust the parameters. Such watermarks themselves could be a function of the time of the year; for example, the volume water marks could be higher around Christmas versus the middle of February; or the result of promotional events including a promotional sale for a pre-specified duration such as a couple of hours, etc. If a certain amount of dollar volume or unit volume is reached in a predetermined time frame—possible need to restock. This information is then automatically communicated to the inventory management system. These watermarks themselves, indeed, may be a function of the time of the year or of promotional events, etc.

The above are only exemplary scenarios for illustration purposes and, of course, by no means constitute a complete list.

The output of '202' in the architecture of FIG. 9 is then filtered by a 'Hysterisis Macro Filter' labeled '204' as per the seller-defined requirements. As an example, '204' may allow data computed over the previous 7 days for some parameters, and 30 days for others, etc.

The RAC-derived signal at '101' and the output of '204' are then used as inputs to the 'Base Value Signal Generator' labeled at '102' which generates the 'Base Value Signal' based on the product information, number of units, class of sellers selected, and the long-term trends, as defined earlier. The 'Value' generated by this generator falls within the hard-coded constraints pre-defined by the seller.

The output of '202' is also filtered by a 'Hysterisis Micro Filter' labeled '203'. again as per the seller-defined requirements. As an example, '203' may be programmed to allow only the previous 30-minutes worth of information during busy hours, such as from 10 am to 7 pm; whereas it may be pre-programmed to 4 hours worth of information during non-busy hours, such as from mid-night to 7 am, and so on.

The output of '203' is then used as an input to a 'Pre-Processor Stage 2' labeled as '205' The other inputs to '205' are the 'Initialized Customer Packet' '101', and the 'Last round best bid value' labeled at '208' from the RAC. These inputs are then processed by '205' to generate the 'Modulating Signal' for the 'Base Value Signal' as generated by '102'. The generator '205' also generates a 'Schedule Promotion' signal which may be based on pre-defined time frames such as holidays (Memorial Day, Thanksgiving, Christmas etc.). It may also be generated in the event that certain watermarks in terms of shipments are not met, etc.

The 'Base Value Signal' from '102' is then modulated by the 'Modulating Signal' from '205' in 'Modulator Stage 1' labeled '103'. The output of this modulator is then validated by a 'Range Checker Circuit' labeled '104', determining if the Modulated Output from '103' is within the pre-specified hard-coded range, or if it is saturated on either side—meaning it is above the high value water mark or below the low value water mark set by the seller. If it is within the range, the signal is then further modulated at a 'Modulator Stage 2' labeled '105' from a modulating signal from the 'Promotional Event Generator' labeled '207'. Other inputs to '105' include 'Promotion Range' constraints set by the seller. These constraints prevent promotion event results from venturing outside of what is acceptable to the seller, unless over-ruled by the seller via a 'Forced Promotion Signal'.

Consider, for example, a scenario where a manufacturer is providing a 40% year end rebate and the seller is further willing to discount an additional 30%—thus a net change of 70%—which may place the final value outside of even the 'Promotion Constraints'. The 'Forced Promotion' signal then is used to overrule these constraints and allow the promotion to proceed. Inputs to '207' include 'Schedule Promotion Signal' from '205' and an 'Opportunistic Promotion Signal' from an 'Opportunistic Promotion Signal Generator' labeled '206'. Inputs to '206' include 'Price Watch & Automated Notification' list and 'Price Watch & Automated Purchase' list. Output of the 'Modulator Stage 2' '105' is then compared with the 'Last Best Value Bid' '208' from the RAC in 'Comparator' module labeled '106'. Another input to '106' is an 'Out of Range' signal from '104'. '106' then makes a final decision to make a new bid better than the last one sent back by the RAC, or decides to drop out. Either way, this information of 'New Bid' or 'No Bid' is communicated to the RAC.

An 'Out of Range Counter' labeled '107' is maintained which keeps track of the number of times in a predefined time duration this condition gets activated. If it exceeds certain watermarks, then it is an indication that the 'Base Value Signal Generator' parameters need to be modified to bring the modulated signal within range.

Frequent saturation of the 'Modulator Stage 1' is a good indication of a substantial macro-level change in the market conditions; whereas, the modulating signal makes finer refinements to the primary 'Base Value Signal' based on real-time competitive data using the hysterisis filter.

This engine ARICE thus iteratively and automatically provides successively new bids or decides not to participate on a dynamic basis, based on the customer profile, both short-term and long-term market feedback, and the seller's own specific business requirements and constraints. This task is accomplished dynamically and automatically within a pre-defined time frame. In an alternate embodiment, this novel engine architecture can be implemented in software instead of custom hardware, although at degraded performance levels.

Tolerance to Faults

As in the case of many computer-programmed or automatically-operated computerized systems, the automated system architecture of the present invention, in practical implementation, requires built-in application-specific fault tolerant mechanisms to avoid catastrophic failures due to hardware/software/network malfunction. The system also requires conventional alarms to request manual intervention or urgent notification in case of emergency, using known monitoring tools and mechanisms and generating reports of system health on a periodic basis. The system, furthermore, provides the human ability to override the automation at will at any time, including avoiding a potential runaway system.

A central goal of the novel architecture for the invention, indeed, is to protect buyers, sellers and the reverse auctioneer, against several classes of faults in the global distributed system, and to enable prompt recovery from several classes of failures. The use of conventional fault-tolerant mechanisms can isolate faults in software and hardware components, preventing the system from failing in the presence of component failures, thereby increasing the overall reliability and dependability of the system.

A fault tolerant state machine-based architecture which maintains requisite synchronization between 'Seller System', 'Reverse Auctioneer System' and 'Buyer System' is provided as will now be more fully described, wherein each uses an individual state machine to ensure the correctness and completion of each reverse auction, enabling core functions such as log-in, log-out, and initiating and recovering from an incomplete reverse auction, and employing separate memory-protected domains for fault isolation. As the number of reverse auctions grows, indeed, these state machines (FIG. 3 for the 'Buyer System') can also be spawned in physically separate hardware to provide optimal scalability to the system, as is well known.

It is now accordingly in order to examine the types of failures that can occur and how they may be dealt with in accordance with the invention.

'Buyer System' Failures

Consider, first, the failure of the 'Buyer System', or the Internet communication channel between the buyer and the RAC. The 'Buyer System' can fail in the following stages of the buyer state machine, FIG. 3:

1. Failure may occur before a 'New Reverse Auction Request' RFRA message is sent to the RAC. In this case, in the preferred embodiment, when the 'Buyer System' restarts, it can retrieve any saved user data from stored memory. In an alternate embodiment, the 'Buyer System' can request the user to re-enter the reverse auction data.
2. Failure may also occur after the new RFRA message is sent, but before the reversed auction results are received by the 'Buyer System'.
3. Failure may occur, moreover, after the reverse auction result message is received, but before the user has accepted the result of the reverse auction.
4. Failure may further occur after the user has accepted the results, but before the transaction has been completed.

In cases 2 to 4, above, the state machine, in accordance with the invention, uses an innovative 'Reverse Auctioneer System'—assisted recovery method for the buyer, having the following steps performed after the 'Buyer System' restarts. After the buyer goes online, its system sends a pending 'Reverse Auction Request' RFRA message to the RAC. In response to this message, the RAC sends a pending reverse auction list message to the buyer containing a listing of pending reverse auctions with sufficient information to enable the buyer to recover the reverse auction state. The information in the message also includes a 'Reverse Auction-ID' that uniquely identifies the state of the reverse auction. On receiving this message, a 'Reverse Auction state machine' is spawned for each reverse auction element in the message. The information in the pending reverse auction list message causes the buyer's reverse auction state machine to go from the initial state to the correct state so that it can be synced up with the RAC. In this way, the system can recover from a buyer failure, no matter when it occurs. There is no need to restart the reverse auction process so long as the buyer recovers within a certain period of time.

This is specifically illustrated in FIG. 13, showing such a buyer system recovery from failure. Part (a) of FIG. 13 illustrates normal operation of the system along with the RAC. The system may, indeed, be concurrently managing multiple reverse auctions and maintaining state for each reverse auction, as illustrated by the dashed boxes. When the system fails, all communication with the RAC as well as internal buyer system state, is lost as at (b), Upon restart, (c), the system sends the 'Pending Auction Request' message to the RAC, to which the RAC responds with the 'Pending Auction List', causing the buyer system to spawn state machines for each reverse auction in the pending auction list, (d). In this way, the buyer system resumes normal operation with state from all the pending reverse auctions that were initiated before the buyer system failure.

Reverse Auctioneer Controller Failures

In order to recover from RAC failures, the system architecture of the invention, as before stated, requires a number of key fault tolerant mechanisms.

Several classes of failures can cause the RAC to go down during the reverse auction. In such cases, the system will use the previously mentioned rollback-recovery techniques to bring all three systems to a consistent state. The RAC will take consistent checkpoints for known good states during the transactions. Both synchronous and asynchronous checkpointing and recovery techniques may be used as applicable, as hereinafter explained.

To enhance performance and availability, all the distributed databases associated with the RAC are preferably replicated in multiple copies, stored at different geographical sites. In order to maintain consistency in the distributed databases, and to allow maximum possible concurrency, several well-known concurrency types of control algorithms may be used. These will include lock-based algorithms for static locking, and two-phase locking, and timestamp-based locking. This ensures that each copy of the data is not only self-consistent, but also that all copies of the data are mutually consistent—a condition required for fast access via regional service, as well as consistent transactions and data management on a global scale.

To provide consistency of replicated information in the presence of failures, the before-mentioned two-phase-commit protocols assure global updates. In order to provide resiliency against site failures, non-blocking commit protocols may also be used. In high net-worth transactions, known voting protocols may be used to protect against multiple-site failures, or against network partitioning.

At individual RAC sites, moreover, back-up processes and systems are preferably running, ready to take-over for a failed node. Redundancy need be deployed at mission-critical sites that hold content and time-sensitive data, and at various levels including process, storage, power supply, communication network and any other single point of failure in the system.

For reaching a global level of scalability in the number of users (potentially hundreds of millions or higher), overlay networks may be used for the RAC. A Distributed Hash Table (DHT) of well-known type, may be used to store and locate buyer, seller and item information. Based on the key generated by the DHT algorithm, a server is chosen for storage; and the object can then be located efficiently using a DHT search across the global system of servers.

FIG. 14 illustrates the steps taken by the RAC to use the above-mentioned checkpointing and rollback recovery to recover from RAC failures. The figure has three parts (a, b and c). Part (a) illustrates normal RAC operation during which the state machine that manages the reverse auctions, takes checkpoints at consistent states, and stores this checkpointed data as well as live reverse auction data in redundant and persistent storage. When the RAC experiences a failure, it may temporarily lose connectivity with the 'Buyer Systems' as well as with the SAEJs, as in earlier-discussed FIG. 13 (b). During this time, messages from the RAC, the 'Buyer Systems' as well as from the SAEJs may be lost, or corrupted, thus creating potentially inconsistent state between these three entities. When the RAC restarts (or recovers from temporary failure), it retrieves the checkpointed state from persistent storage, and continues to reverse auction from the last known good state, as illustrated in the rollback recovery of FIG. 14 (c).

FIG. 15 illustrates an embodiment of how the RAC may use redundancy to increase its availability. In this scenario, two RAC systems are concurrently running, parts (a) and (b), illustrating respectively, normal operation, and operation during a single RAC failure. During normal operation, one RAC is selected as the active RAC while the other is the standby RAC. The standby RAC is indeed a Hot Standby RAC as labeled and illustrated in the figure, because the active RAC replicates its entire state to the standby. The standby does not communicate with either the 'Buyer System' or the SAEJ, but replicates the state of the active RAC. In the case of the failure of the active RAC, however, the Hot Standby RAC takes over the role of the active, and continues the reverse auction. The failure of the active RAC is not visible to the buyer or to the SAEJ because the standby was running in lock step with the active RAC.

Seller Automated Engine (SAEJ) Failures

The 'SAEJ' is continually participating in reverse auctions of potentially large dollar value and liability to the seller. In a short period of time (seconds), the 'SAEJ' may generate hundreds or more bids depending on the specific implementation. The overall system holds the 'SAEJ' liable for any bid received by the RAC. As a result, to protect the seller, the 'SAEJ' must be error-free, resilient and fault tolerant such that incorrect bids are not generated. The 'SAEJ' architecture of the invention, accordingly, uses the following mechanisms to provide highly available and error-free operation.

FIG. 16 illustrates a preferred fault tolerant architecture for the present invention and its components of a single SAEJ element. All packets from the RAC are first checked by the packet checker labeled 'PACKET CHECKER'. The output of the packet checker is sent to three separate ARICE engines (labeled ARICE), and their results compared by a majority voting engine labeled 'VOTING ENGINE'. The results of the voting engine are sent to a final range checker labeled 'BID RANGE CHECKER' for sanity checking the bid before being transmitted to the RAC. It should be noted that each component in the SAEJ is connected to a diagnostic module labeled 'DIAG MODULE'. This enables on-board as well as in-service diagnostics capability. Each component in the SAEJ is also connected to an error generator labeled 'ERROR GENERATOR'. This enables each component to throw errors and/or exceptions to the error generator. The error generator, in turn, passes these errors as "Alarms" to the appropriate administrative entity. The figure also shows redundant fans, redundant power supplies as well as a RAID controller responsible for managing redundant disks.

In FIG. 17, preferred redundancy techniques that may be used by the SAEJ to improve availability are shown. In parts (a) and (b) of the figure, two SAEJ systems are concurrently running, illustrating normal operation, and operation during single SAEJ failure, respectively. During normal operation, one SAEJ is selected as the active SAEJ, while the other is the standby SAEJ. The standby SAEJ is indeed a Hot Standby SAEJ (as illustrated in the figure), because the active SAEJ replicates its entire state to the standby. The standby does not communicate with the RAC, but replicates the state of the active SAEJ. In case of failure of the active SAEJ, the Hot Standby SAEJ takes over the role of active, and continues the reverse auction. The failure of the active SAEJ is not visible to the RAC because the standby was running in lock step with the active.

A modification is shown in part (c) of FIG. 17, illustrating another type of redundancy architecture running in lock step, and without any distinction between active or standby. The incoming RAC requests are replicated to each SAEJ using a splitter (labeled 'Splitter'). All three SAEJs process the same input, and have access to the same redundant databases. Their results are sent to a Voting Engine, so-labeled, that uses a majority vote to send the bid response to the SAEJ. This technique is similar to the one used within the SAEJ for ARICE, as earlier explained in connection with FIG. 16, but provides a higher level of protection for the entire SAEJ.

The above techniques thus increase the availability of the SAEJ, as well as protect the SAEJ from generating incorrect bids. Despite such techniques, however, there are certain classes of catastrophic failures that may still cause the SAEJ to fail. In such case, the system will ensure that the SAEJ failure will not stall the entire auction, and that the SAEJ will be able to retrieve the auction data on recovery. As an example, consider the case of a reverse auction, where after the first round of bidding, a seller session gets abnormally terminated. During this time, the SAEJ may be unable to participate in subsequent automated iterations of the bidding process.

If the RAC times out (FIG. 4-RACT) waiting for a bid from one or more SAEJs, the following options may be used:

The preferred embodiment is to continue the round without such SAEJ(s).

An alternative embodiment is to retransmit the bid request to that seller 'M' times. This ensures that all SAEJs can respond, but increases the duration of each round. Yet another alternate embodiment is to rollback to the end of the last round (discard all bids for this round) and restart this round. This ensures that all sellers retransmit their bids. Care must be taken, however, to have a unique bid request id within the round. If, after restarting the round (say, for example, three times), there are still unresponsive sellers, then the reverse auction may continue with the remaining sellers.

The SAEJ that, after losing connectivity or after voluntarily leaving, wishes to rejoin the reverse auction that had proceeded to the next round, can be allowed to do so based on a policy-based implementation.

Once the winner is picked, however, the buyer and the winning SAEJ are informed and the transaction phase is started (FIGS. 7-12).

Summary of 'Fault Tolerant Architecture' Advantages

These advantages are unique as implemented in the novel automated architecture of the invention and are not available in the prior and current proposed solutions. They may be summarized as follows:

The ARTIST fault tolerance architecture allows the 'Buyer System' to remain simple; as an example, it can be implemented within a small memory footprint for cell phones, PDAs etc., while providing complete recovery from several classes of failures. The system, moreover, does not need to deploy any expensive redundancy or persistence mechanisms, and recovers by retrieving reverse auction state from the RAC. In conventional solutions, on the other hand, a failure on the buyer side results in the data being lost, and the process needs to restart.

In the ARTIST fault tolerant architecture, moreover, during an on-going reverse auction, the SAEJ recovers from faults by retrieving reverse auction state from the RAC. Should the SAEJ go offline, the seller cannot participate in bidding; but any bids already received by the RAC are not lost. In the typical prior browser-based systems, the reverse auctioneer merely connects the buyer and the seller, and cannot facilitate any failure recovery.

SAEJ failures are, in accordance with the present invention, hidden from buyers who are, indeed, protected from such SAEJ failures. If the SAEJ fails in the middle of a reverse auction, and if a previously sent bid from the SAEJ happens to be the winning bid, the RAC guarantees that, on SAEJ recovery, the transaction is initiated based on the winning bid.

The seller, furthermore, as earlier explained, is protected from system failures on the buyer side. If such as system should fail after the RAC has received the buyer's acceptance of the results of an auction, indeed, the RAC guarantees that the transaction between the buyer and seller is initiated, and the buyer's acceptance is binding. The reverse auction itself is also tolerant to SAEJ failures. The before-described clock-tick timeout mechanism ensures that a failed SAEJ does not stall the entire reverse auction.

As for the reverse auction itself, it is also tolerant to buyer system failures. Once the RAC receives the RFRA (or RFQ/RFPWAN/RFPWAP) from the buyer system, no other interaction is required from that system. Any buyer system failures during this time do not affect the bidding process between the RAC and the SAEJs. On the buyer system, the RAC and the SAEJs, moreover, individual reverse auctions are protected from one another for a class of failures.

The architecture, indeed, allows each reverse auction to be conducted in its own protected space thus ensuring isolation of failures from one reverse auction to another. All communication is also protected against corruption due to communication channel errors by using the previously described checksum and forward error corrections in the transmitted packets.

The fault tolerant mechanism deployed at the RAC, additionally, is flexible and scalable depending upon the requirements and scale of the reverse auction. The RAC may choose a range of fault-tolerant mechanisms, such as the discussed checkpointing and rollback recovery, database replication, commit, and voting protocols and redundancy. The ARTIST fault tolerance architecture allows the RAC to scale incrementally as the number of RACs increases. Multiple Virtual RACs can be simply installed on a single hardware platform, and then, as the number of reverse auctions grows, moved in-service to new hardware platforms in a hitless manner.

The use of the before-mentioned DHTs and overlay networks, furthermore, allows the RACs to be geographically distributed in such a way that no single RAC is required to contain the entire RAC database (list of buyers, sellers, items). The RACs can communicate with one another and indeed retrieve any item in the database as if they were accessing their own database.

The automatically optimized real-time 'Buyer-Centric Reverse Auction' of the invention that has been above-described, thus results in a number of significant advantages over prior art existing systems, as earlier detailed. The concepts of the invention may also be further expanded and offered also to wireless devices, such as where a buyer is at a traditional store such as 'Circuit City' or 'Best Buy' and is requiring price comparison. The invention provides the capability to get that data on the spot. There are also opportunities to create 'Buyer's Clubs' under this umbrella, enabling further preferential pricing treatment as a volume buyer. As before stated, while the units herein have generally been used to indicate a product, the concept of the invention is not limited to products only, and can be easily applied to other types of trading and services.

Further modifications and obvious extensions and applications of the novel architecture and facets of the invention will also occur to those skilled in this art; and such are considered to fall within the spirit and scope of the invention as defined in the appended claims.

What is claimed is:

1. A method of automatically requesting and receiving, in real-time and on-line over a communication network, price quotations from one or more sellers of products and/or services, that comprises:
submitting a request for price quotations from a buyer system to an intermediate controller processor;
submitting the received buyer request over the network to computers of the sellers in real-time upon receipt by the intermediate controller;
automatically generating, by adaptive engines of the sellers' computers and without manual intervention, price quotations responsive to the buyer request;
returning the generated price quotations to the controller over the network;
automatically processing the seller price quotations received back over the network at the controller and thereupon communicating one or more of them back to the buyer, all with no manual intervention.

2. The method of claim 1, wherein the buyer request is accompanied by buyer-specific profile information and/or buyer-specific shopping portfolio information, and wherein at least one of the buyer-specific shopping portfolio information, buyer-specific profile information, and/or buyer request includes one or more of: historic buyer information; buyer's purchasing history; desired volume of purchase; desired price or price ranges of purchase; the buyer's willingness to accept seller or reverse auction service provider promotions and/or advertisements; particular classes of desired sellers; price limits; a consumer index number (CIN); and/or buyer personal information.

3. The method of claim 2, further comprising submitting targeted advertising and/or promotions to the buyer system, the targeted advertising and/or promotions factoring the buyer-specific profile information.

4. The method of claim 2, further comprising submitting targeted advertising and/or promotions to the buyer system, the targeted advertising and/or promotions factoring the CIN.

5. The method of claim 1, wherein the buyer request is accompanied by information containing details for the controller to develop a unique buyer consumer index.

6. The method of claim 1, wherein all returned price quotations are communicated from the controller to the buyer system.

7. The method of claim 1, wherein only the best returned price quotation is communicated from the controller to the buyer system.

8. The method of claim 1, further comprising the buyer designating that only certain class/classes of sellers participate.

9. The method of claim 1, further comprising maintaining, within at least one seller engine, seller-specific pricing data.

10. The method of claim 1, further comprising containing, within at least one seller engine, historic buyer information factored in generating the price quotation.

11. The method of claim 1, wherein the buyer request is for a single product.

12. The method of claim 1, wherein the buyer request is for multiple products of a same type.

13. The method of claim 1, wherein the buyer request is for multiple unrelated products.

14. A system for conducting real-time transactions between buyers and one or more sellers of products and/or services through an intermediate controller communicating on-line with both buyer and seller over a communication network, the system having, in combination:
   a processor contained in the intermediate controller for receiving over the network and automatically, in real-time upon receipt, processing on-line buyer requests for seller price quotations, where said requests are accompanied by respective buyer-specific profile and/or shopping portfolio information, and for thereupon communicating the same requests over the network to the one or more sellers;
   each seller being equipped with a seller automatic adaptive engine containing that seller's specific marketing strategy and/or market condition information, where said engine is responsive to the communicated buyer requests in order to automatically and without manual intervention create and respond to the controller with a price quotation based upon the buyer request and said buyer-specific profile information and/or shopping portfolio information where supplied and within the respective guidelines of the seller-specific information contained in that seller's automatic seller engine;
   said processor automatically processing at the controller the price quotations received back over the network from the seller automatic engines and automatically communicating back to the buyer one or more of the price quotations received from the sellers, all with no manual intervention.

15. The system of claim 14, wherein all received price quotations are communicated from the controller to the buyer.

16. The system of claim 14, wherein only the best received price quotation is communicated from the controller to the buyer.

17. They system of claim 14, wherein at least one of the seller engines contains historic buyer information factored in creating the price quotation.

18. The system of claim 14, wherein the buyer request is for a single product.

19. The system of claim 14, wherein the buyer request is for multiple products of the same type.

20. The system of claim 14, wherein the buyer request is for multiple unrelated products.

21. The system of claim 14, wherein at least one of the shopping portfolio information, profile information, and/or buyer request includes one or more of: historic buyer information; buyer's purchasing history; desired volume of purchase; desired price or price ranges of purchase; the buyer's willingness to accept seller or reverse auction service provider promotions and/or advertisements; particular classes of desired sellers; price limits; a consumer index number (CIN); and/or buyer personal information.

22. The system of claim 14, wherein the buyer designates that only certain class/classes of sellers participate.

23. The system of claim 14, wherein at least one seller engine maintains its own pricing data therein.

24. The system of claim 14, wherein the buyer profile is factored by the seller engines and/or intermediate controller to generate targeted advertising and/or promotions of buyer interest.

25. The system of claim 14, wherein the buyer profile contains details for the intermediate controller to develop a unique buyer consumer index.

26. The system of claim 25, wherein the consumer index is factored by the seller engines and/or intermediate controller to generate targeted advertising and/or promotions of buyer interest.

27. The system of claim 25, wherein the buyer may designate sub-buyers and their respective profiles on an account of the buyer.

28. The system of claim 27, wherein the buyer and designated sub-buyers pool their buying power to obtain optimum seller engine pricing and/or group discount eligibility.

* * * * *